United States Patent
Lin et al.

(10) Patent No.: US 11,996,779 B2
(45) Date of Patent: *May 28, 2024

(54) SYSTEMS AND METHODS FOR VOLTAGE COMPENSATION BASED ON LOAD CONDITIONS IN POWER CONVERTERS

(71) Applicant: ON-BRIGHT ELECTRONICS (SHANGHAI) CO., LTD., Shanghai (CN)

(72) Inventors: Wuping Lin, Shanghai (CN); Yunchao Zhang, Shanghai (CN); Jianfeng Huang, Shanghai (CN); Lieyi Fang, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/077,692

(22) Filed: Dec. 8, 2022

(65) Prior Publication Data

US 2023/0216418 A1    Jul. 6, 2023

Related U.S. Application Data

(63) Continuation of application No. 17/508,051, filed on Oct. 22, 2021, now Pat. No. 11,552,570, which is a
(Continued)

(30) Foreign Application Priority Data

Dec. 29, 2018 (CN) .......................... 201811636515.5

(51) Int. Cl.
*H02M 3/335* (2006.01)
*H02M 1/08* (2006.01)
*H02M 7/04* (2006.01)

(52) U.S. Cl.
CPC ......... *H02M 3/33523* (2013.01); *H02M 1/08* (2013.01); *H02M 3/33507* (2013.01); *H02M 7/04* (2013.01)

(58) Field of Classification Search
CPC ............... H02M 3/33523; H02M 1/08; H02M 3/33507; H02M 7/02; H02M 7/04;
(Continued)

(56) References Cited

U.S. PATENT DOCUMENTS 3,912,340 A   10/1975 Bertolasi
5,247,241 A    9/1993 Shunsaku
(Continued)

FOREIGN PATENT DOCUMENTS

CN    1841893 A    10/2006
CN    1917322 A     2/2007
(Continued)

OTHER PUBLICATIONS

Chinese Patent Office, Office Action dated Aug. 4, 2020, in Application No. 201811636515.5.
(Continued)

*Primary Examiner* — Adolf D Berhane
(74) *Attorney, Agent, or Firm* — Faegre Drinker Biddle & Reath LLP

(57) ABSTRACT

Systems and methods for voltage compensation based on load conditions in power converters. For example, a system controller for regulating a power converter includes a first controller terminal; a second controller terminal; and a compensation current generator. The compensation current generator is configured to receive an input signal through the first controller terminal. The input signal indicates a first current flowing through a primary winding of a power converter. The compensation current generator is configured to receive a demagnetization signal related to a demagneti-
(Continued)

zation period of the power converter and associated with an auxiliary winding of the power converter. The compensation current generator is configured to generate a compensation current based at least in part on the input signal and the demagnetization signal. The compensation current generator is connected to a resistor. The resistor is configured to generate a compensation voltage based at least in part on the compensation current.

26 Claims, 8 Drawing Sheets

Related U.S. Application Data continuation of application No. 16/276,487, filed on Feb. 14, 2019, now Pat. No. 11,190,106.

(58) Field of Classification Search
CPC .......... H02M 7/42; G05F 1/462; G05F 1/465; G05F 1/13; G05F 1/614
See application file for complete search history.

(56) References Cited

U.S. PATENT DOCUMENTS

| | | | |
|---|---|---|---|
| 5,497,119 A | 3/1996 | Tedrow et al. |
| 5,568,044 A | 10/1996 | Bittner |
| 5,729,448 A | 3/1998 | Haynie et al. |
| 6,134,060 A | 10/2000 | Ryat |
| 6,292,376 B1 | 9/2001 | Kato |
| 6,366,066 B1 | 4/2002 | Wilcox |
| 6,366,070 B1 | 4/2002 | Cooke et al. |
| 6,381,151 B1 | 4/2002 | Jang |
| 6,545,513 B2 | 4/2003 | Tsuchida et al. |
| 6,556,478 B2 | 4/2003 | Willis et al. |
| 6,713,995 B2 | 3/2004 | Chen |
| 6,798,086 B2 | 9/2004 | Utsunomiya |
| 6,947,298 B2 | 9/2005 | Uchida |
| 6,954,056 B2 | 10/2005 | Hoshino et al. |
| 6,972,528 B2 | 12/2005 | Shao |
| 6,972,548 B2 | 12/2005 | Tzeng et al. |
| 6,977,824 B1 | 12/2005 | Yang et al. |
| 7,035,119 B2 | 4/2006 | Koike |
| 7,054,169 B2 | 5/2006 | Huh et al. |
| 7,116,089 B1 | 10/2006 | Nguyen et al. |
| 7,173,404 B2 | 2/2007 | Wu |
| 7,208,927 B1 | 4/2007 | Nguyen |
| 7,262,587 B2 | 8/2007 | Takimoto et al. |
| 7,265,999 B2 | 9/2007 | Murata et al. |
| 7,345,895 B2 | 3/2008 | Zhu et al. |
| 7,394,634 B2 | 7/2008 | Fang et al. |
| 7,414,865 B2 | 8/2008 | Yang |
| 7,456,623 B2 | 11/2008 | Hasegawa et al. |
| 7,492,619 B2 | 2/2009 | Ye et al. |
| 7,522,431 B2 | 4/2009 | Huynh et al. |
| 7,605,576 B2 | 10/2009 | Kanakubo |
| 7,609,039 B2 | 10/2009 | Hasegawa |
| 7,684,220 B2 | 3/2010 | Fang et al. |
| 7,684,462 B2 | 3/2010 | Ye et al. |
| 7,813,392 B2 | 10/2010 | Li et al. |
| 7,826,237 B2 | 11/2010 | Zhang et al. |
| 7,852,055 B2 | 12/2010 | Michishita |
| 7,898,825 B2 | 3/2011 | Mulligan et al. |
| 7,990,202 B2 | 8/2011 | Fang et al. |
| 8,085,027 B2 | 12/2011 | Lin et al. |
| 8,213,203 B2 | 7/2012 | Fei et al. |
| 8,242,742 B2 | 8/2012 | Kao et al. |
| 8,305,776 B2 | 11/2012 | Fang |
| 8,331,112 B2 | 12/2012 | Huang et al. |
| 8,339,814 B2 | 12/2012 | Zhang et al. |
| 8,391,028 B2 | 3/2013 | Yeh |
| 8,488,342 B2 | 7/2013 | Zhang et al. |
| 8,526,203 B2 | 9/2013 | Huang et al. |
| 8,879,289 B2 | 11/2014 | Lin et al. |
| 8,891,256 B2 | 11/2014 | Fang et al. |
| 8,971,062 B2 | 3/2015 | Huang et al. |
| 8,982,585 B2 | 3/2015 | Fang |
| 9,088,217 B2 | 7/2015 | Zhang et al. |
| 9,325,234 B2 | 4/2016 | Zhang et al. |
| 9,350,252 B2 | 5/2016 | Zhang et al. |
| 9,379,623 B2 | 6/2016 | Zhang et al. |
| 9,379,624 B2 | 6/2016 | Lin et al. |
| 9,385,612 B2 | 7/2016 | Zhang et al. |
| 9,559,598 B2 | 1/2017 | Fang et al. |
| 9,577,537 B2 | 2/2017 | Zhang et al. |
| 9,584,025 B2 | 2/2017 | Lin et al. |
| 9,871,451 B2 | 1/2018 | Lin et al. |
| 9,906,144 B2 | 2/2018 | Zhang et al. |
| 9,929,655 B2 | 3/2018 | Fang et al. |
| 10,003,271 B2 | 6/2018 | Fang et al. |
| 10,008,939 B2 | 6/2018 | Zhang et al. |
| 10,069,424 B2 | 9/2018 | Lin et al. |
| 10,158,294 B2 | 12/2018 | Fang et al. |
| 10,199,944 B2 | 2/2019 | Fang et al. |
| 10,224,821 B2 | 3/2019 | Zhang et al. |
| 10,270,350 B2 | 4/2019 | Lin et al. |
| 10,277,132 B2 | 4/2019 | Zhang et al. |
| 10,291,131 B2 | 5/2019 | Lin et al. |
| 10,454,378 B2 | 10/2019 | Lin et al. |
| 10,742,122 B2 | 8/2020 | Lin et al. |
| 11,190,106 B2 | 11/2021 | Lin et al. |
| 11,552,570 B2 * | 1/2023 | Lin .................. H02M 1/08 |
| 2002/0080625 A1 | 6/2002 | Goyhenetche et al. |
| 2002/0080631 A1 | 6/2002 | Kanouda et al. |
| 2003/0174520 A1 | 9/2003 | Bimbaud |
| 2004/0075600 A1 | 4/2004 | Vera et al. |
| 2005/0057238 A1 | 3/2005 | Yoshida |
| 2005/0073862 A1 | 4/2005 | Mednik et al. |
| 2005/0116697 A1 | 6/2005 | Matsuo et al. |
| 2005/0222646 A1 | 10/2005 | Kroll et al. |
| 2005/0270807 A1 | 12/2005 | Strijker |
| 2006/0034102 A1 | 2/2006 | Yang et al. |
| 2006/0043953 A1 | 3/2006 | Xu |
| 2006/0050539 A1 | 3/2006 | Yang et al. |
| 2006/0055433 A1 | 3/2006 | Yang et al. |
| 2006/0098463 A1 | 5/2006 | Baurle et al. |
| 2006/0146895 A1 | 7/2006 | Lee |
| 2006/0273772 A1 | 12/2006 | Groom |
| 2007/0115696 A1 | 5/2007 | Berghegger |
| 2007/0171687 A1 | 7/2007 | Kogel et al. |
| 2007/0241733 A1 | 10/2007 | Chen et al. |
| 2007/0273345 A1 | 11/2007 | Chen et al. |
| 2008/0061754 A1 | 3/2008 | Hibi |
| 2008/0112193 A1 | 5/2008 | Yan et al. |
| 2008/0157742 A1 | 7/2008 | Martin et al. |
| 2008/0159378 A1 | 7/2008 | Kris |
| 2008/0225563 A1 | 9/2008 | Seo |
| 2008/0252345 A1 | 10/2008 | Deschamp et al. |
| 2009/0051336 A1 | 2/2009 | Hartlieb et al. |
| 2009/0058387 A1 | 3/2009 | Huynh et al. |
| 2009/0073727 A1 | 3/2009 | Huynh et al. |
| 2009/0121697 A1 | 5/2009 | Aiura et al. |
| 2009/0141520 A1 | 6/2009 | Grande et al. |
| 2009/0175057 A1 | 7/2009 | Grande et al. |
| 2009/0206814 A1 | 8/2009 | Zhang et al. |
| 2009/0219000 A1 | 9/2009 | Yang |
| 2009/0251219 A1 | 10/2009 | Fiocchi et al. |
| 2009/0302817 A1 | 12/2009 | Nagai |
| 2010/0026270 A1 | 2/2010 | Yang et al. |
| 2010/0027300 A1 | 2/2010 | Fang |
| 2010/0061126 A1 | 3/2010 | Huynh et al. |
| 2010/0128501 A1 | 5/2010 | Huang et al. |
| 2010/0141178 A1 | 6/2010 | Negrete et al. |
| 2010/0219802 A1 | 9/2010 | Lin et al. |
| 2010/0225293 A1 | 9/2010 | Wang et al. |
| 2011/0044076 A1 | 2/2011 | Zhang et al. |
| 2011/0096574 A1 | 4/2011 | Huang |
| 2011/0149614 A1 | 6/2011 | Stracquadaini |
| 2011/0182089 A1 | 7/2011 | Genannt Berghegger |
| 2011/0248770 A1 | 10/2011 | Fang et al. |
| 2011/0267853 A1 | 11/2011 | Yang et al. |
| 2012/0013321 A1 | 1/2012 | Huang et al. |
| 2012/0075891 A1 | 3/2012 | Zhang et al. |

(56) References Cited

U.S. PATENT DOCUMENTS

| | | |
|---|---|---|
| 2012/0139435 A1 | 6/2012 | Storm |
| 2012/0147630 A1 | 6/2012 | Cao et al. |
| 2012/0153919 A1 | 6/2012 | Garbossa et al. |
| 2012/0195076 A1 | 8/2012 | Zhang et al. |
| 2012/0224397 A1 | 9/2012 | Yeh |
| 2012/0257423 A1 | 10/2012 | Fang |
| 2012/0281438 A1 | 11/2012 | Fang et al. |
| 2012/0300508 A1 | 11/2012 | Fang et al. |
| 2012/0320640 A1 | 12/2012 | Baeurle et al. |
| 2013/0027989 A1 | 1/2013 | Fang |
| 2013/0033905 A1 | 2/2013 | Lin et al. |
| 2013/0051090 A1 | 2/2013 | Xie et al. |
| 2013/0148396 A1 | 6/2013 | Walters |
| 2013/0182476 A1 | 7/2013 | Yang et al. |
| 2013/0223107 A1 | 8/2013 | Zhang et al. |
| 2013/0272033 A1 | 10/2013 | Zhang et al. |
| 2013/0308350 A1 | 11/2013 | Huang et al. |
| 2014/0078790 A1 | 3/2014 | Lin et al. |
| 2014/0085943 A1 | 3/2014 | Lin et al. |
| 2014/0160801 A1 | 6/2014 | Stamm |
| 2014/0160809 A1 | 6/2014 | Lin et al. |
| 2014/0268920 A1 | 9/2014 | Fang et al. |
| 2015/0003119 A1 | 1/2015 | Li |
| 2015/0055378 A1 | 2/2015 | Lin et al. |
| 2015/0117066 A1 | 4/2015 | Schmid et al. |
| 2015/0162820 A1 | 6/2015 | Zhang et al. |
| 2015/0180347 A1 | 6/2015 | Fang et al. |
| 2015/0295499 A1 | 10/2015 | Zhang et al. |
| 2015/0296574 A1 | 10/2015 | Knoedgen et al. |
| 2015/0311804 A1 | 10/2015 | Fang |
| 2016/0028318 A1 | 1/2016 | Fang et al. |
| 2016/0218631 A1 | 7/2016 | Zhang et al. |
| 2016/0315543 A1 | 10/2016 | Zhang et al. |
| 2016/0329818 A1 | 11/2016 | Lin et al. |
| 2016/0329821 A1 | 11/2016 | Zhang et al. |
| 2016/0354792 A1 | 12/2016 | Su |
| 2016/0365792 A1 | 12/2016 | Zhang et al. |
| 2017/0187293 A1 | 6/2017 | Fang et al. |
| 2018/0109195 A1 | 4/2018 | Lin et al. |
| 2018/0109196 A1 | 4/2018 | Lin et al. |
| 2018/0131284 A1 | 5/2018 | Fang et al. |
| 2019/0013738 A1 | 1/2019 | Lin et al. |
| 2019/0260294 A1 | 8/2019 | Lin et al. |
| 2020/0212811 A1 | 7/2020 | Lin et al. |
| 2022/0045616 A1 | 2/2022 | Lin et al. |
| 2022/0190729 A1 | 6/2022 | Lin et al. |

FOREIGN PATENT DOCUMENTS

| | | |
|---|---|---|
| CN | 1929274 A | 3/2007 |
| CN | 1964172 A | 5/2007 |
| CN | 1988347 A | 6/2007 |
| CN | 101034851 A | 9/2007 |
| CN | 101039077 A | 9/2007 |
| CN | 101079576 A | 11/2007 |
| CN | 101127495 A | 2/2008 |
| CN | 101247083 A | 8/2008 |
| CN | 101295872 A | 10/2008 |
| CN | 100454740 C | 1/2009 |
| CN | 101350562 A | 1/2009 |
| CN | 101515756 A | 8/2009 |
| CN | 101552560 A | 10/2009 |
| CN | 101577468 A | 11/2009 |
| CN | 101577488 A | 11/2009 |
| CN | 101826796 A | 9/2010 |
| CN | 101515756 B | 11/2011 |
| CN | 102332826 A | 1/2012 |
| CN | 102474964 A | 5/2012 |
| CN | 102624237 A | 8/2012 |
| CN | 102651613 A | 8/2012 |
| CN | 102709880 A | 10/2012 |
| CN | 102723945 A | 10/2012 |
| CN | 102801325 A | 11/2012 |
| CN | 102983760 A | 3/2013 |
| CN | 103166198 A | 6/2013 |
| CN | 103296904 A | 9/2013 |
| CN | 104040452 A | 9/2014 |
| CN | 104541221 A | 4/2015 |
| CN | 104853493 A | 8/2015 |
| JP | 2006-080262 A | 3/2006 |
| TW | 200840174 A | 10/2008 |
| TW | 200937157 A | 9/2009 |
| TW | I434167 B | 4/2014 |
| TW | I437808 B | 5/2014 |
| TW | I446137 B | 7/2014 |
| TW | I448060 B | 8/2014 |

OTHER PUBLICATIONS

Chinese Patent Office, Office Action dated Dec. 4, 2015, in Application No. 201410226277.6.
Chinese Patent Office, Office Action dated Dec. 8, 2014, in Application No. 201110034669.9.
Chinese Patent Office, Office Action dated Jun. 4, 2014, in Application No. 201110144768.2.
Chinese Patent Office, Office Action dated Nov. 12, 2013, in Application No. 201110051423.2.
Chinese Patent Office, Office Action dated Nov. 14, 2013, in Application No. 201110224933.5.
Chinese Patent Office, Office Action dated Nov. 25, 2015, in Application No. 201310656906.4.
Chinese Patent Office, Office Action dated Nov. 5, 2013, in Application No. 201210529679.4.
Chinese Patent Office, Office Action dated Nov. 5, 2013, in Application No. 201310078547.9.
Chinese Patent Office, Office Action dated Nov. 7, 2013, in Application No. 201210342097.5.
Taiwan Patent Office, Office Action dated Jun. 27, 2019, in Application No. 108103624.
Taiwan Patent Office, Office Action dated Mar. 3, 2014, in Application No. 100127088.
Taiwan Patent Office, Office Action dated May 6, 2015, in Application No. 102116550.
Taiwan Patent Office, Office Action dated Oct. 1, 2014, in Application No. 102116551.
Taiwan Patent Office, Office Action dated Oct. 16, 2015, in Application No. 102116550.
Taiwan Patent Office, Office Action dated Oct. 6, 2014, in Application No. 102115002.
United States Patent and Trademark Office, Notice of Allowance dated Jan. 11, 2023, in U.S. Appl. No. 17/508,044.
United States Patent and Trademark Office, Office Action dated Aug. 25, 2022, in U.S. Appl. No. 17/508,044.

\* cited by examiner

SYSTEMS AND METHODS FOR VOLTAGE COMPENSATION BASED ON LOAD CONDITIONS IN POWER CONVERTERS

1. CROSS-REFERENCES TO RELATED APPLICATIONS

This application is a continuation of U.S. Patent Application No. 1.7/508,051, filed Oct. 22, 2021, which is a continuation of U.S. patent application Ser. No. 16/276,487, tiled Feb. 14, 2019, which claims priority to Chinese Patent Application No. 201811636515.5, filed Dec. 29, 2018, all of these applications being incorporated by reference herein for all purposes.

2. BACKGROUND OF THE INVENTION

Certain embodiments of the present invention are directed to integrated circuits. More particularly, some embodiments of the invention provide systems and methods for voltage compensation based on load conditions in power converters. Merely by way of example, some embodiments of the invention have been applied to flyback power converters. But it would be recognized that the invention has a much broader range of applicability.

In recent years, with the development of integrated circuit and information technology, a variety of battery-powered portable electronic devices, such as mobile phones, digital cameras, and notebook computers, became increasingly popular. These battery-powered portable electronic devices raise the need for high-performance power-management chips with low cost, high efficiency and good transient characteristics.

Flyback power converters have been used extensively for its simple structure and low cost in low-power power supplies. But in conventional flyback power converters, the output-voltage regulation is often performed with secondary-side feedback, using an isolated arrangement of opto-coupler and shunt regulator (e.g., TL431). Such arrangement usually increases the system cost, size, and power consumption.

To reduce the system cost and size of the flyback power converter, converters that employ primary-side regulation have become popular for certain applications. In primary-side regulation, the output voltage is sensed by detecting the voltage of the auxiliary winding that is tightly coupled to the secondary winding. Since the voltage of the auxiliary winding should image the output voltage associated with the secondary winding, the detected voltage can be utilized to regulate the secondary-side output voltage. Hence, the expensive parts of opto-coupler and shunt regulator (e.g., TL431) often are no longer needed in order to save system cost and size.

FIG. 1 is a simplified diagram of a conventional flyback power converter with primary-side regulation (PSR). The power converter 100 includes a system controller 102, a rectifying component 104 (e.g., a bridge rectifier), a primary winding 106 (e.g., Np), a secondary winding 108 (e.g., Ns), a power switch 110 (e.g., M1), a rectifying diode 112 (e.g., D1), two capacitors 114 and 116 (e.g., C0 and C1), three resistors 118, 120 and 122 (e.g., R1, R2 and R3), a current sensing resistor 124 (e.g., $R_{CS}$), and an auxiliary winding 126. The system controller 102 includes a constant current (CC) control component 128, a constant voltage (CV) control component 130, a load compensation component 132, and a drive and modulation component 134. The system controller 102 further includes five terminals 136, 138, 140, 142 and 144. For example, the power switch 110 is a field-effect transistor (FET), a bipolar junction transistor (BJT), or an insulated-gate bipolar transistor (IGBT). In one example, the system controller 102, including components 128, 130, 132 and 134, is located on a chip. For example, the terminals 136, 138, 140, 142 and 144 are pins of the chip.

As shown in FIG. 1, a system controller 102 is used to control and drive the power switch 110 (e.g., M1, a power MOSFET), which turns on and off to control (e.g., regulate) the output voltage and/or output current delivered to the load 146 on the secondary side of the power converter 100. An alternating-current (AC) input voltage 148 is applied to the power converter 100. The rectifying component 104 outputs a bulk voltage 150 (e.g., a rectified voltage no smaller than 0 V) associated with the AC input voltage 148. The capacitor 116 (e.g., C1) is charged in response to the bulk voltage 150 through the resistor 118 (e.g., R1), and a voltage 152 is provided to the controller 102 at the terminal 136 (e.g., terminal VCC). If the voltage 152 is larger than a threshold voltage (e.g., an under-voltage lock-out threshold) in magnitude, the controller 102 begins to operate, and a voltage associated with the terminal 136 (e.g., terminal VCC) is clamped to a predetermined voltage.

In addition, the terminal 138 (e.g., terminal GATE) is connected to a gate terminal of the power switch 110 (e.g., M1). The controller 102 outputs a drive signal 154 (e.g., a pulse-width-modulation signal) with a certain frequency and a certain duty cycle to close (e.g., turn on) or open (e.g., turn off) the power switch 110 so that the power converter 100 operates normally.

For example, if power switch 110 is closed, the power converter 100 stores the energy associated with AC input voltage 148. In another example, if the power switch 110 is opened, the stored energy is delivered to the secondary side of the power converter 100 via the transformer including the primary winding 106 and the secondary winding 108. The output voltage 156 (e.g., $V_{out}$) is mapped to the feedback voltage 158 (e.g., $V_{FB}$) through the auxiliary winding 126 and by resistors 120 and 122 (e.g., R2 and R3), and received by the controller 102 at terminal 144 (e.g., terminal FB). In this way, the controller on the primary side receives information about the output voltage and demagnetization of the power converter that can be used to regulate the output voltage, and, in turn, achieve constant voltage (CV) and/or constant current (CC) output.

Referring to FIG. 1, the feedback voltage 158 (e.g., $V_{FB}$) of the power converter 100 can be determined as follows:

$$V_{FB} = \frac{R_2}{R_2 + R_3} V_{aux} = \frac{R_2}{R_2 + R_3}(V_{out} + V_d) \times \frac{n_a}{n_s} \qquad \text{(Equation 1)}$$

where $V_{aux}$ represents the voltage of the auxiliary winding 126 during a demagnetization period of the power converter 100, $R_2$ represents the resistance of resistor 120, $R_3$ represents the resistance of resistor 122, $V_{out}$ represents the output voltage 156, $V_d$ represents the voltage drop across the diode 112 (e.g., D1), $n_a$ represents the number of turns of the auxiliary winding 126, and $n_s$ represents the number of turns of the secondary winding 108.

Based on Equation 1, the relationship between $V_{FB}$ and $V_{out}$ can be determined as follows:

$$V_{out} = \frac{R_2 + R_3}{R_2} V_{FB} \times \frac{n_s}{n_a} - V_d \qquad \text{(Equation 2)}$$

Hence, the output voltage 156 can be regulated through the regulation of the voltage of the auxiliary winding 126. Since $V_{FB}$ is an image of the output voltage $V_{out}$, the output voltage is proportional to $V_{FB}$. Under certain conditions, the output voltage 156 is regulated at a constant level, if the feedback voltage $V_{FB}$ and voltage $V_d$ across diode 112 (e.g., D1) are kept constant by the controller 102. However, for a given diode, the voltage $V_d$ is current dependent, and therefore $V_d$ changes if the load current $I_{load}$ changes.

Moreover, the output cable line 160 generates a voltage drop that is proportional to the load current $I_{load}$. This voltage drop causes the load voltage $V_{load}$ received by the load 146 to decrease if the load current $I_{load}$ increases. Assuming the resistance of the output cable line is $R_{cable}$, the load voltage $V_{load}$ at an equipment terminal 162 can be determined as follows:

$$V_{load} = \hspace{3cm} \text{(Equation 3)}$$
$$V_{out} - R_{cable} \times I_{load} = \frac{R_2 + R_3}{R_2} V_{FB} \times \frac{n_s}{n_a} - V_d - R_{cable} \times I_{load}$$

On one hand, different magnitudes of the load current result in different voltage drops across the diode 112 and the output cable line 160, and, thus, the load voltage $V_{load}$ is not constant at different load current levels. Rather, based on Equation 3, the load voltage $V_{load}$ decreases as the load current $I_{load}$ increases. Hence, at a default-load condition (e.g., the load current and/or load voltage being within a predetermined operating range of the power converter) or a high-load condition, the power converter 100 exhibits poor load-voltage regulation due to the voltage drop across the diode 112 and/or the output cable line 160.

On the other hand, the controller 102 is powered via the auxiliary winding 126 through the voltage 152 provided to the controller 102 at the terminal 136 (e.g., terminal VCC). Hence, the controller also represents a load of the system. If the load current is small or there is no load connected to the equipment terminal 162 of the system, the current drawn by the controller 102 is not negligible. In this case, the secondary winding 108 and the auxiliary winding 126 exhibit cross regulation that results in the controller 102 being unable to regulate the load voltage $V_{load}$. Thus, if the system is at a light-load or no load, the load voltage $V_{load}$ becomes uncontrollably high due to cross regulation.

Hence it is highly desirable to improve the techniques of power converters.

3. BRIEF SUMMARY OF THE INVENTION

Certain embodiments of the present invention are directed to integrated circuits. More particularly, some embodiments of the invention provide systems and methods for voltage compensation based on load conditions in power converters. Merely by way of example, some embodiments of the invention have been applied to flyback power converters. But it would be recognized that the invention has a much broader range of applicability.

According to one embodiment, a system controller for regulating a power converter includes a first controller terminal; a second controller terminal; and a compensation current generator. The compensation current generator is configured to receive an input signal through the first controller terminal. The input signal indicates a first current flowing through a primary winding of a power converter. The compensation current generator is configured to receive a demagnetization signal related to a demagnetization period of the power converter and associated with an auxiliary winding of the power converter. The compensation current generator is configured to generate a compensation current based at least in part on the input signal and the demagnetization signal. The compensation current generator is connected to a resistor. The resistor is configured to generate a compensation voltage based at least in part on the compensation current and output a first reference voltage based at least in part on the compensation voltage and a second reference voltage. The system controller is configured to: generate an amplified signal based at least in part on the second reference voltage; generate a drive signal based at least in part on the amplified signal; and output the drive signal through the second controller terminal to a switch to affect the first current flowing through the primary winding of the power converter.

According to another embodiment, a system controller for regulating a power converter includes: a sample-and-hold signal generator; a multiplier; and a first filter. The sample-and-hold signal generator is configured to receive a first input signal and generate a sampled-and-held signal based at least in part on the first input signal. The first input signal indicates a first current flowing through a primary winding of a power converter. The sampled-and-held signal represents a peak of the first current. The multiplier is configured to receive a demagnetization signal and generate a multiplication signal based on at least information associated with the demagnetization signal and the sampled-and-held signal. The demagnetization signal is related to a demagnetization period of the power converter and is associated with an auxiliary winding of the power converter. The first filter is configured to receive the multiplication signal and generate a first filtered signal based at least in part on the multiplication signal. The first filtered signal is related to a drive signal outputted to a switch to affect the first current flowing through the primary winding of the power converter.

According to yet another embodiment, a system controller for regulating a power converter includes: a signal generator; and an error amplifier. The signal generator is configured to receive an input signal and a reference signal and output an output signal to generate a drive signal. The output signal is equal to an amplification value multiplied by a difference between the input signal and the reference signal. The error amplifier is configured to generate the input signal based on at least information associated with the output signal. The system controller is configured to: generate the drive signal based on at least information associated with the input signal; and output the drive signal to a switch of a power converter to affect a current flowing through a primary winding of the power converter.

According to yet another embodiment, a system controller for regulating a power converter includes: a first controller terminal; a second controller terminal; a compensation current generator; and an error amplifier. The compensation current generator is configured to: receive an input signal through the first controller terminal. The input signal indicates a first current flowing through a primary winding of a power converter. The compensation current generator is configured to: receive an amplified signal; and generate a compensation current based at least in part on the input signal and the amplified signal. The error amplifier is configured to: generate the amplified signal based on at least information associated with the compensation current; output the amplified signal to the compensation current generator; and output the amplified signal to generate a drive signal outputted through the second controller terminal to a switch to affect the first current flowing through the primary winding of the power converter.

According to yet another embodiment, a system controller for regulating a power converter includes: a first controller terminal; a second controller terminal; a compensation current generator; and an error amplifier. The compensation current generator is configured to: receive an input signal through the first controller terminal. The input signal indicates a first current flowing through a primary winding of a power converter. The compensation current generator is configured to: receive a demagnetization signal related to a demagnetization period of the power converter and associated with an auxiliary winding of the power converter; receive an amplified signal; in response to the power converter operating under a first load condition, generate a compensation current based at least in part on the input signal and the amplified signal; and in response to the power converter operating under a second load condition, generate the compensation current based at least in part on the input signal and the demagnetization signal. The error amplifier is configured to: generate the amplified signal based on at least information associated with the compensation current; output the amplified signal to the compensation current generator; and output the amplified signal to generate a drive signal outputted through the second controller terminal to a switch to affect the first current flowing through the primary winding of the power converter. The first load condition and the second load condition are different.

According to yet another embodiment, a method for regulating a power converter includes: receiving an input signal. The input signal indicates a first current flowing through a primary winding of a power converter. The method includes: receiving a demagnetization signal related to a demagnetization period of the power converter and associated with an auxiliary winding of the power converter; generating a compensation current based at least in part on the input signal and the demagnetization signal; generating a compensation voltage based at least in part on the compensation current; outputting a first reference voltage based at least in part on the compensation voltage and a second reference voltage; generating an amplified signal based at least in part on the second reference voltage; generating a drive signal based at least in part on the amplified signal; and outputting the drive signal to a switch to affect the first current flowing through the primary winding of the power converter.

According to yet another embodiment, a method for regulating a power converter includes: receiving an input signal. The input signal indicates a current flowing through a primary winding of a power converter. The method includes: generating a sampled-and-held signal based at least in part on the input signal. The sampled-and-held signal represents a peak of the current. The method includes: receiving a demagnetization signal; and generating a multiplication signal based on at least information associated with the demagnetization signal and the sampled-and-held signal. The demagnetization signal is related to a demagnetization period of the power converter and is associated with an auxiliary winding of the power converter. The method includes: receiving the multiplication signal; and generating a filtered signal based at least in part on the multiplication signal. The filtered signal is related to a drive signal. The method includes: outputting the drive signal to a switch to affect the first current flowing through the primary winding of the power converter.

According to yet another embodiment, a method for regulating a power converter includes: receiving an input signal and a reference signal; and outputting an output signal to generate a drive signal. The output signal is equal to an amplification value multiplied by a difference between the input signal and the reference signal. The method includes: generating the input signal based on at least information associated with the output signal; generating the drive signal based on at least information associated with the input signal; and outputting the drive signal to a switch of a power converter to affect a current flowing through a primary winding of the power converter.

According to yet another embodiment, a method for regulating a power converter includes: receiving an input signal. The input signal indicates a first current flowing through a primary winding of a power converter. The method includes: receiving an amplified signal; generating a compensation current based at least in part on the input signal and the amplified signal; generating the amplified signal based on at least information associated with the compensation current; generating a drive signal based at least in part on the amplified signal; and outputting the drive signal to a switch to affect the first current flowing through the primary winding of the power converter.

According to yet another embodiment, a method for regulating a power converter includes: receiving an input signal. The input signal indicates a first current flowing through a primary winding of a power converter. The method includes: receiving a demagnetization signal related to a demagnetization period of the power converter and associated with an auxiliary winding of the power converter; receiving an amplified signal; in response to the power converter operating under a first load condition, generating a compensation current based at least in part on the input signal and the amplified signal; in response to the power converter operating under a second load condition, generating the compensation current based at least in part on the input signal and the demagnetization signal; generating the amplified signal based on at least information associated with the compensation current; generating a drive signal based at least in part on the amplified signal; and outputting the drive signal to a switch to affect the first current flowing through the primary winding of the power converter. The first load condition and the second load condition are different.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

Certain embodiments of the present invention are directed to integrated circuits. More particularly, some embodiments of the invention provide systems and methods for voltage compensation based on load conditions in power converters. Merely by way of example, some embodiments of the invention have been applied to flyback power converters. But it would be recognized that the invention has a much broader range of applicability.

According to some embodiments, the systems and methods include a two-segment voltage compensation scheme based on the load conditions in the power converters. For example, segment I of the compensation scheme compensates for a voltage drop across an output cable line of the power converter (e.g., at a high-load condition). In another example, segment II of the compensation scheme compensates for cross regulation at a load condition (e.g., at a no-load condition or at a light-load condition).

Figure 1:
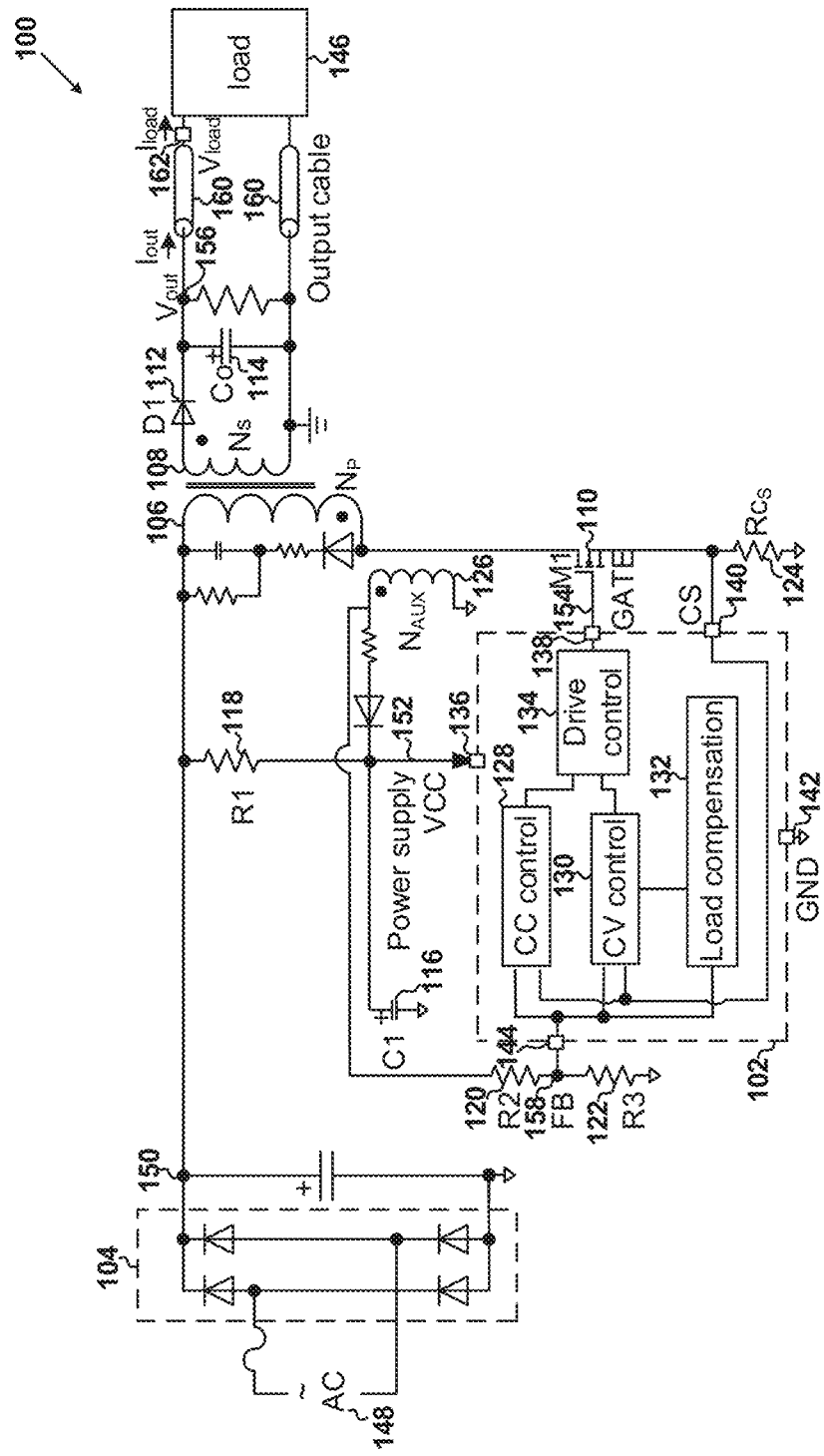
FIG. 1 is a simplified diagram of a conventional flyback power converter with primary-side regulation (PSR).
Figure 2:
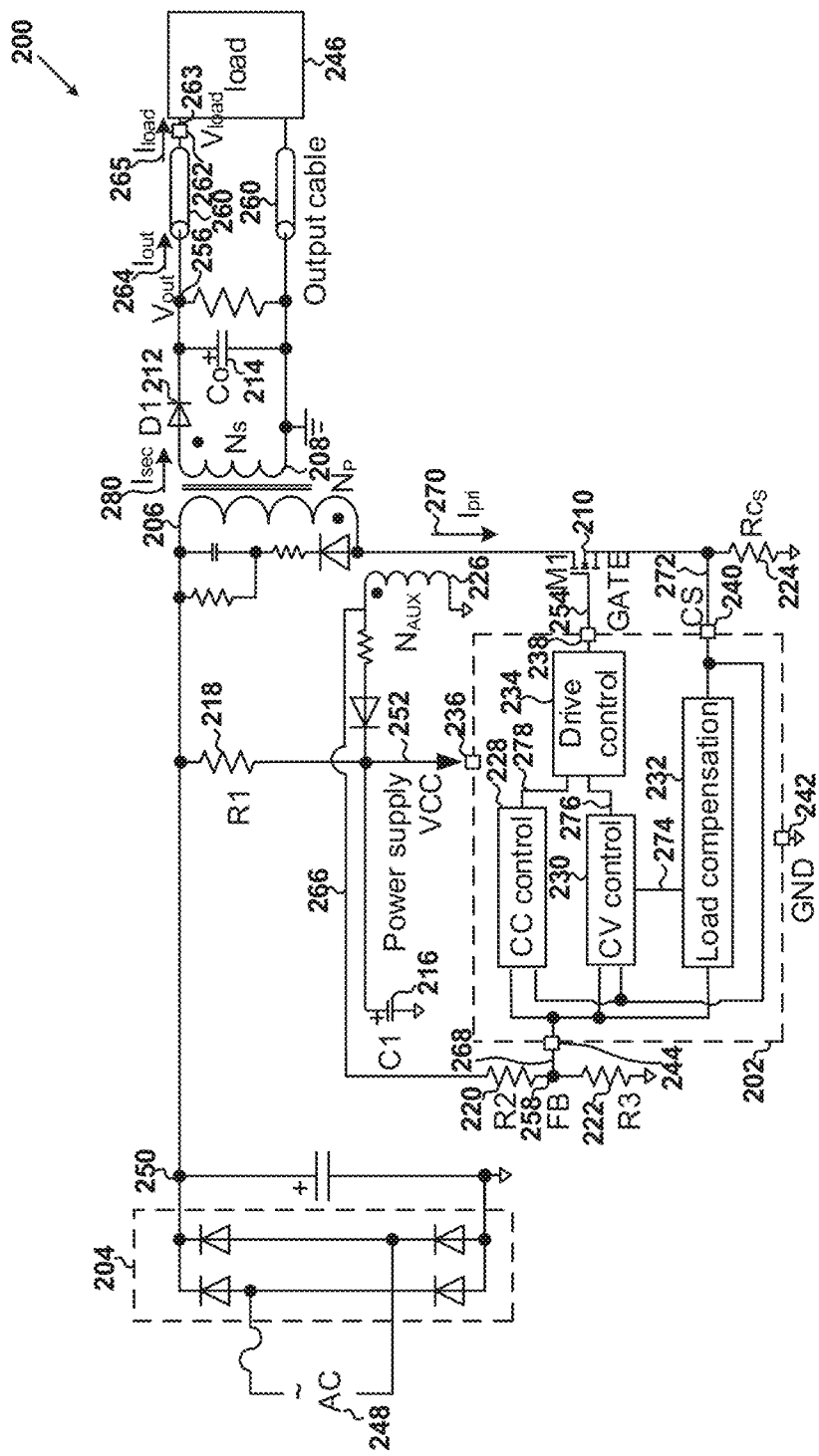
FIG. 2 is a simplified diagram showing a flyback power converter with primary-side regulation and load compensation according to one embodiment of the present invention.

FIG. 2 is a simplified diagram showing a flyback power converter with primary-side regulation and load compensation according to one embodiment of the present invention. This diagram is merely an example, which should not unduly limit the scope of the claims. One of ordinary skill in the art would recognize many variations, alternatives, and modifications. The power converter 200 includes a system controller 202, a rectifying component 204 (e.g., a bridge rectifier), a primary winding 206, a secondary winding 208, a power switch 210 (e.g., M1), a rectifying diode 212 (e.g., D1), two capacitors 214 and 216 (e.g., C0 and C1), three resistors 218, 220 and 222 (e.g., R1, R2 and R3), a current-sensing resistor 224 (e.g., $R_{CS}$), and an auxiliary winding 226. In one embodiment, the system controller 202 includes a constant current (CC) control component 228, a constant voltage (CV) control component 230, a load compensation component 232, and a drive and modulation component 234. For example, the system controller 202 further includes five terminals 236, 238, 240, 242 and 244. In another example, the power switch 210 is a field-effect transistor (FET), a bipolar junction transistor (BJT), or an insulated-gate bipolar transistor (IGBT). In one embodiment, the system controller 202, including components 228, 230, 232 and 234, is located on a chip. For example, the terminals 236, 238, 240, 242 and 244 are pins of the chip. In another embodiment, the terminal 242 is biased to a predetermined voltage (e.g., ground).

According to one embodiment, a system controller 202 is used to control and drive the power switch 210 (e.g., M1, a power MOSFET), which turns on and off to control (e.g., regulate) the load voltage 263 (e.g., $V_{load}$) and/or the load current 265 (e.g., $I_{load}$) delivered to the load 246 on the secondary side of the power converter 200. For example, the output current 264 (e.g., $I_{out}$) is the load current 265 (e.g., $I_{load}$) of the power converter 200. In another example, the load current 265 (e.g., $I_{load}$) of the power converter 200 is received by the load 246. In yet another example, an alternating-current (AC) input voltage 248 is applied to the power converter 200. In one example, the rectifying component 204 outputs a bulk voltage 250 (e.g., a rectified voltage no smaller than 0 V) associated with the AC input voltage 248. In yet another example, the capacitor 216 (e.g., C1) is charged in response to the bulk voltage 250 through the resistor 218 (e.g., R1), and a voltage 252 is provided to the controller 202 at the terminal 236 (e.g., terminal VCC). According to one example, if the voltage 252 is larger than a threshold voltage (e.g., an under-voltage lock-out threshold) in magnitude, the controller 202 begins to operate, and a voltage associated with the terminal 236 (e.g., terminal VCC) is clamped to a predetermined voltage. In another example, the terminal 238 (e.g., terminal GATE) is connected to a gate terminal of the power switch 210 (e.g., M1). For example, the controller 202 outputs a drive signal 254 (e.g., a pulse-width-modulation signal) with a certain frequency and a certain duty cycle to close (e.g., turn on) or open (e.g., turn off) the power switch 210 so that the power converter 200 operates normally.

For example, if power switch 210 is closed, the power converter 200 stores the energy associated with AC input voltage 248. In another example, if the power switch 210 is opened, the stored energy is delivered to the secondary side of the power converter 200 via the transformer including the primary winding 206 and the secondary winding 208. In one example, the output voltage 256 (e.g., $V_{out}$) is mapped to the feedback voltage 258 (e.g., $V_{FB}$) through the auxiliary winding 226 and by resistors 220 and 222 (e.g., R2 and R3), and received by the controller 202 at terminal 244 (e.g., terminal FB). In another example, the resistors 220 and 222 (e.g., R2 and R3) receive an auxiliary current 266 that flows through the auxiliary winding 226, and in response outputs a feedback signal 268 associated with the feedback voltage 258 (e.g., $V_{FB}$) to the terminal 244 (e.g., terminal FB). In yet another example, the controller on the primary side receives information about the output voltage and demagnetization of the power converter that can be used to control (e.g., regulate) the load voltage 263 (e.g., $V_{load}$) and/or load current 265 (e.g., $I_{load}$), and, in turn, achieve constant voltage (CV) and/or constant current (CC) output.

According to another embodiment, a primary current 270 that flows through the primary winding 206 is sensed by the current-sensing resistor 224, which in response outputs the sensed signal 272 to the terminal 240 (e.g., terminal CS). For example, the sensed signal 272 is received by the load compensation component 232 through the terminal 240 (e.g., terminal CS) of the controller 202. In another example, the load compensation component 232 receives the feedback signal 268 through the terminal 244 (e.g., terminal FB) of the controller 202. In yet another example, the load compensation component 232 generates a signal 274 based on at least the sensed signal 272 and/or the feedback signal 268, and outputs the signal 274.

In one embodiment, the CV control component 230 receives the signal 274 from the load compensation component 232. In one example, the CV control component 230 receives the sensed signal 272 through the terminal 240 (e.g., terminal CS) of the controller 202. In another example, the CV control component 230 receives the feedback signal 268 through the terminal 244 (e.g., terminal FB) of the controller 202. In yet another example, the CV control component 230 generates a signal 276 based on the sensed signal 272, the feedback signal 268 and the signal 274, and outputs the signal 276 to the drive and modulation component 234.

In another embodiment, the CC control component 228 receives the feedback signal 268 through terminal 244 (e.g., terminal FB) on the primary side of the power converter 200. In one example, the CC control component 228 receives the sensed signal 272 through terminal 240 (e.g., terminal CS) of the controller 202. For example, the CC control component 228 generates a signal 278 based on the sensed signal 272 and the feedback signal 268, and outputs the signal 278 to the drive and modulation component 234. In yet another embodiment, the drive and modulation component 234 generates the drive signal 254 based on the signals 276 and 278, and in response outputs the drive signal 254 to the power switch 210.

Figure 3:
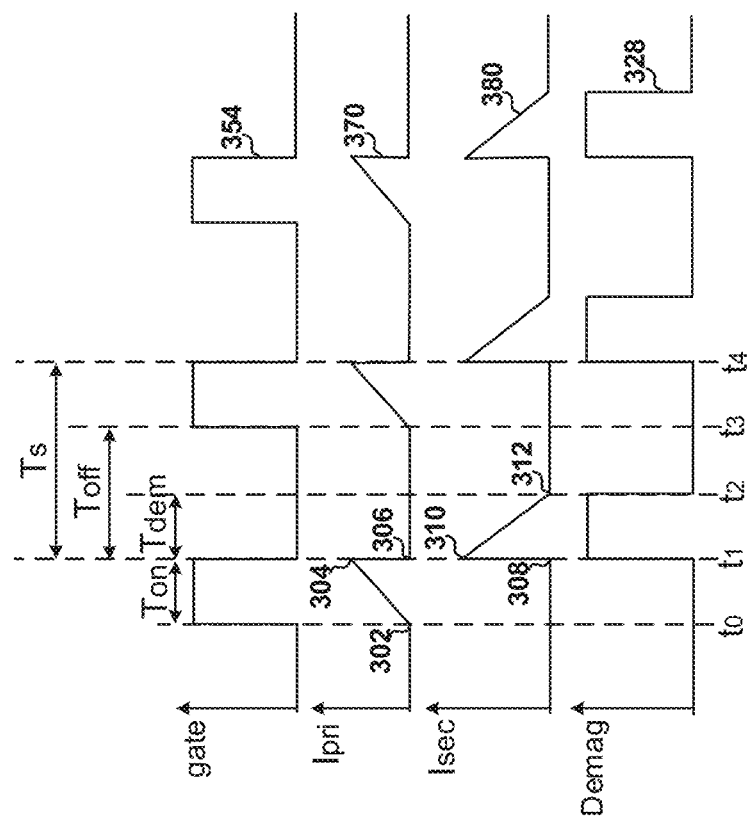
FIG. 3 is a simplified timing diagram for the power converter as shown in FIG. 2 according to one embodiment of the present invention.

FIG. 3 is a simplified timing diagram for the power converter 200 according to one embodiment of the present invention. This diagram is merely an example, which should not unduly limit the scope of the claims. One of ordinary skill in the art would recognize many variations, alternatives, and modifications. In one embodiment, the waveform 354 represents the drive signal 254 as a function of time. For example, the waveform 354 indicates turned-on and turned-off conditions of the switch 210 as a function of time. In another embodiment, the waveform 370 represents the primary current 270 (e.g., $I_{pri}$) as a function of time. For example, the primary current 270 (e.g., $I_{pri}$) flows through the switch 210. In yet another embodiment, the waveform 380 represents the secondary current 280 (e.g., $I_{sec}$) as a function of time. For example, the secondary current 280 flows through the rectifying diode 212. In yet another embodiment, the waveform 328 represents a demagnetization signal associated with the feedback signal 268 as a function of time. For example, if the waveform 354 is at a logic high level, the switch 210 is closed (e.g., turned on), and if the waveform 354 is at a logic low level, the switch 210 is open (e.g., turned off).

According to one embodiment, four time periods $T_{on}$, $T_{off}$, $T_{dem}$, and $T_s$ are shown in FIG. 3. For example, the time period $T_{on}$ starts at time t0 and ends at time $t_1$, and the time period $T_{off}$ starts at time $t_1$ and ends at time $t_3$. In another example, the time period $T_{dem}$ starts at the time $t_1$ and ends at time $t_2$, and the time period $T_s$ starts at the time $t_1$ and ends at the time $t_4$. For example, $t_0 \leq t_1 \leq t_2 \leq t_3 \leq t_4$. In yet another example, the time period $T_{dem}$ represents the signal pulse width of the demagnetization signal, and is within the time period $T_{off}$. According to one example, the time period $T_s$ (e.g., switching period) is the signal period of the demagnetization signal, and includes the time period $T_{dem}$ (e.g., demagnetization period).

According to another embodiment, the load current 265 (e.g., the output current 264) is the average value of the secondary current 280 (e.g., $I_{sec}$) after rectification by the diode 212, and load current $I_{load}$ can be written as:

$$I_{load} = \frac{1}{2} \times I_{sec} \times \frac{T_{dem}}{T_s} \quad \text{(Equation 4)}$$

For example, assuming the ratio of number of turns of the primary winding 206 to the number of turns of secondary winding 208 is $N_s$, $I_{sec}$ is:

$$I_{sec} = I_{pri} \times N_S \quad \text{(Equation 5)}$$

In another example, further assuming the voltage across the current-sensing resistor 224 is $V_{CS}$ and its resistance is $R_{CS}$, $I_{pri}$ is:

$$I_{pri} = \frac{V_{CS}}{R_{CS}} \quad \text{(Equation 6)}$$

According to yet another embodiment, substituting Equations 5 and 6 into Equation 4, the load current $I_{load}$ (e.g., the output current 264) can be expressed as follows:

$$I_{load} = \frac{1}{2} \times I_{sec} \times \frac{T_{dem}}{T_s} = \frac{1}{2} \times \frac{V_{CS}}{R_{CS}} \times N_S \times \frac{T_{dem}}{T_s} \quad \text{(Equation 7)}$$

For example, if Rcs and Ns are constant for the power converter 200, the load current $I_{load}$ (e.g., the output current 264) is equivalent to:

$$I_{load} = K \times V_{CS} \times \frac{T_{dem}}{T_s} \quad \text{(Equation 8)}$$

where $$K = \frac{1}{2R_{CS}} \times N_S$$

represents a constant value and the load current 265 (e.g., $I_{load}$) is proportional to $$V_{CS} \times \frac{T_{dem}}{T_s}.$$

Based on Equation 8, $I_{pri}$ and $T_{dem}$ can be used to determine the load current $I_{load}$ (e.g., the output current 264) according to some embodiments. In one embodiment, the controller 202 generates the signal 274. For example, the signal 274 corresponds the load current $I_{load}$ (e.g., the output current 264), and can be used to compensate for the drop in the load voltage 263 (e.g., the drop that is caused by the voltage drop across the diode 212 and/or caused by the output cable line 260).

In one embodiment, the load condition depends on the load current 265 (e.g., the output current 264). For example, the load condition is a no-load condition (e.g., the load current 265 being equal to zero). In another example, the load condition is a low-load condition (e.g., the load current 265 being small in magnitude). In yet another example, the load condition is a high-load condition (e.g., the load current 265 being large in magnitude).

For example, the signal 274 can be used to compensate for the drop in the load voltage 263 (e.g., the drop that is caused by the voltage drop across the diode 212 and/or caused by the output cable line 260) (e.g., at a high-load condition). In yet another example, the signal 274 can be used to compensate the increase in the load voltage 263 (e.g., the increase caused by cross regulation) (e.g., at a no-load condition or a low-load condition). In yet another example, the signal 274 can be used to compensate for the drop in the load voltage 263 (e.g., the drop that is caused by the voltage drop across the diode 212 and/or caused by the output cable line 260) (e.g., at a high-load condition), and also compensate for the increase in the load voltage 263 (e.g., the increase caused by cross regulation) (e.g., at a no-load condition or at a low-load condition).

According to one embodiment, under a default load condition, the signal 274 can be used to compensate for the drop in the load voltage 263 (e.g., the drop that is caused by the voltage drop across the diode 212 and/or caused by the output cable line 260). According to another embodiment, under a default condition, the signal 274 can be used to compensate the increase in the load voltage 263 (e.g., the increase caused by cross regulation).

According to another embodiment, during a time period (e.g., $T_{on}$) when the switch 210 is closed (e.g., turned on), the primary current 270 (e.g., $I_{pri}$) increases from a low value (e.g., the value 302 that is, for example, approximately zero at $t_0$) to a peak value (e.g., the peak-current value 304 at $t_1$) as shown by the waveform 370. For example, at a time (e.g., $t_1$) when the switch 210 changes from closed (e.g., turned on) to open (e.g., turned off), the primary current 270 (e.g., $I_{pri}$) decreases from a peak value (e.g., the peak-current value 304 at $t_1$) to a low value (e.g., the value 306 that is, for example, approximately zero at $t_1$) as shown by the waveform 370. In another example, at a time (e.g., $t_1$) when the switch 210 changes from closed (e.g., turned on) to open (e.g., turned off), the secondary current 280 (e.g., $I_{sec}$) increases from a low value (e.g., the value 308 that is, for example, approximately zero at $t_1$) to a peak value (e.g., the peak-current value 310 at $t_1$) as shown by the waveform 380. In yet another example, during a time period (e.g., $T_{dem}$) the secondary current 280 (e.g., $I_{sec}$) decreases from a high value (e.g., the value 310 at $t_1$) to a low value (e.g., the value 312 at $t_2$) as shown by waveform 380.

Figure 4:
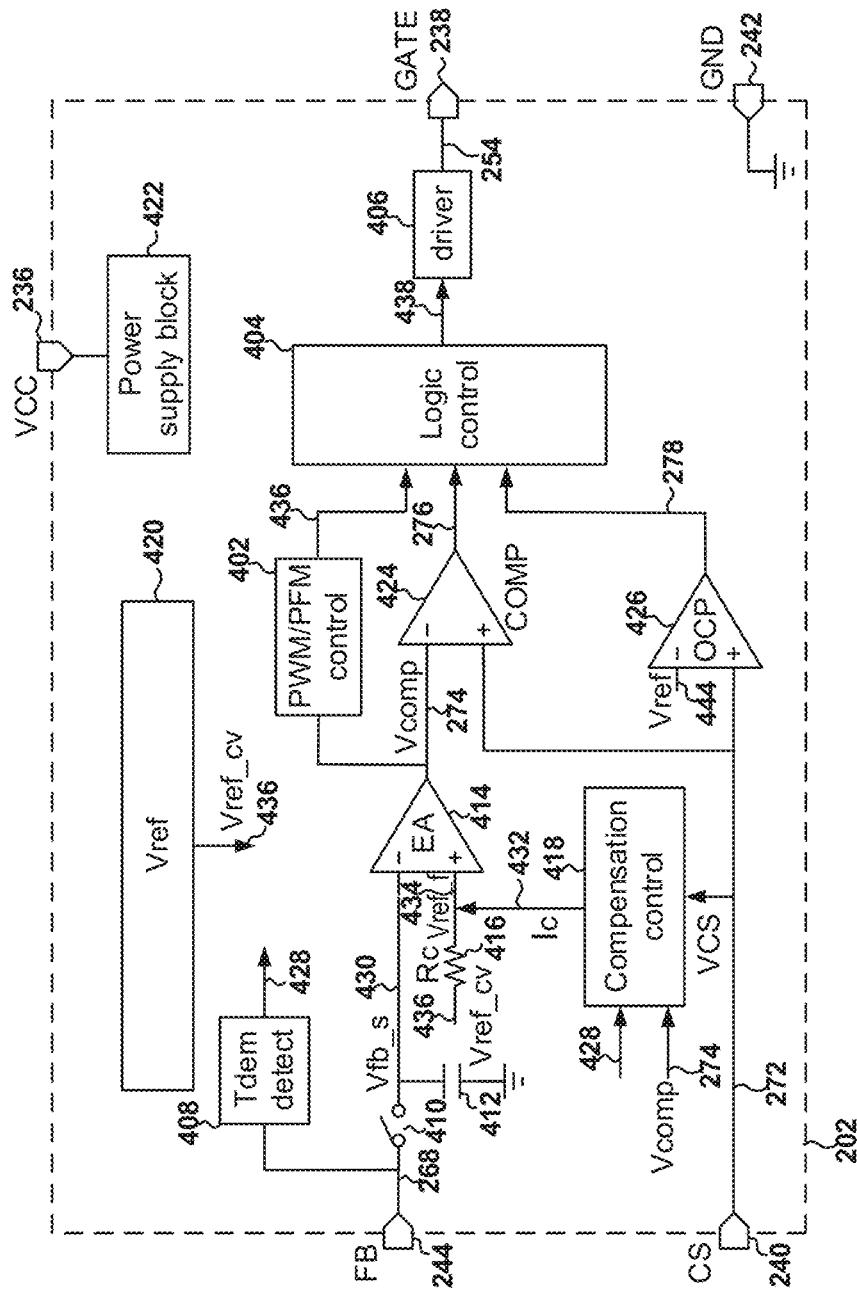
FIG. 4 is a simplified diagram showing a controller as part of the power converter as shown in FIG. 2 according to one embodiment of the present invention.

FIG. 4 is a simplified diagram showing a controller as part of the power converter 200 according to one embodiment of the present invention. This diagram is merely an example, which should not unduly limit the scope of the claims. One of ordinary skill in the art would recognize many variations, alternatives, and modifications. The controller 202 includes a modulation component 402 (e.g., PWM/PFM control), a logic control component 404, a driver 406, a demagnetization detector 408, a switch 410, a capacitor 412, an error amplifier 414 (e.g., EA), a resistor 416 (e.g., $R_c$), a compensation signal generator 418 (e.g., a compensation current generator), a reference signal generator 420, a power supply component 422 (e.g., power supply block), and two comparators 424 and 426 (e.g., COMP and OCP). In one embodiment, the controller 202 further includes five terminals 236, 238, 240, 242 and 244. In another embodiment, the controller 202 is located on a chip. For example, the terminals 236, 238, 240, 242 and 244 are pins of the chip. In yet another embodiment, the power supply component 422 (e.g., power supply block) is connected to terminal 236 (e.g., terminal VCC). According to another embodiment, the terminal 242 is biased to a predetermined voltage (e.g., ground).

According to one embodiment, the demagnetization detector 408 receives the feedback signal 268 through the terminal 244 (e.g., terminal FB) of the controller 202. For example, the demagnetization detector 408 generates a demagnetization signal 428 based on the feedback signal 268, and outputs the demagnetization signal 428 to the compensation signal generator 418. As an example, the demagnetization signal 428 relates to a demagnetization period (e.g., $T_{dem}$) of the power converter 200. In one example, the demagnetization signal 428 is associated with the auxiliary winding 226. For example, the feedback signal 268 relates to the auxiliary winding 226.

According to another embodiment, the controller 202 includes a sample-and-hold circuit configured to sample the feedback signal 268 and output a sampled signal 430 (e.g., $V_{fb\_s}$) based in part on the feedback signal 268. For example, the sample-and-hold includes the switch 410 and the capacitor 412. In one example, the switch 410 receives the feedback signal 268 through the terminal 244 (e.g., terminal FB) of the controller 202, and samples the feedback signal 268 during the demagnetization of the auxiliary winding 226. For example, if the switch 410 is closed (e.g., turned on), the feedback signal 268 flows through the switch 410 to charge the capacitor 412 to generate and hold the sampled signal 430 (e.g., $V_{fb\_s}$), which is received by an inverting terminal (e.g., the "−" terminal) of the error amplifier 414. In another example, the feedback signal 268 is sampled during the time period $T_{dem}$. In yet another example, if the switch 410 is open (e.g., turned off), the capacitor 412 provides the sampled signal 430 to the inverting terminal (e.g., the "−" terminal) of the error amplifier 414.

According to yet another embodiment, the compensation signal generator 418 receives the sensed signal 272 through terminal 240 (e.g., terminal CS) of the controller 202. For example, the compensation signal generator 418 receives the demagnetization signal 428 from the demagnetization detector 408. In another example, the compensation signal generator 418 receives the signal 274 (e.g., $V_{comp}$) from the error amplifier 414 (e.g., EA).

In one embodiment, the compensation signal generator 418 generates a compensation signal 432 (e.g., $I_c$) based on the sensed signal 272, the signal 274 (e.g., $V_{comp}$) and the demagnetization signal 428. In another embodiment, the compensation signal generator 418 generates the compensation signal 432 (e.g., $I_c$) based on the sensed signal 272 and the demagnetization signal 428. In yet another embodiment, the compensation signal generator 418 generates a compensation signal 432 (e.g., $I_c$) based on the signal 274 (e.g., $V_{comp}$).

In another example, the compensation signal 432 (e.g., $I_c$) is a compensation current. For example, the compensation signal 432 (e.g., $I_c$) flows through the resistor 416 (e.g., $R_c$) to generate a compensation voltage $\Delta V_c$. As an example, the resistor 416 (e.g., $R_c$) is configured to generate the compensation voltage $\Delta V_c$ based in part on the compensation signal 432 (e.g., $I_c$). In one example, the resistor 416 (e.g., $R_c$) is configured to output a reference signal 434 based in part on the compensation signal 432 (e.g., $I_c$) and a reference signal 436. For example, the reference signal 434 is a reference voltage (e.g., internal reference voltage $V_{ref\_f}$). As an example, the reference signal 436 is a reference voltage (e.g., reference voltage $V_{ref\_cv}$). In one example, the compensation voltage $\Delta V_c$ can be expressed as follows:

$$\Delta V_c = R_c \times I_c \quad \text{(Equation 9)}$$

In yet another example, based on Equation 8, the compensation signal generator 418 determines the magnitude of the load current $I_{load}$ (e.g., the output current 264) to compensate for the drop in the load voltage 263 (e.g., the drop that is caused by the voltage drop across the diode 212 and/or caused by the output cable line 260). For example, the compensation signal 432 (e.g., $I_c$) is generated based on information associated with the magnitude of the load current $I_{load}$ (e.g., the output current 264).

According to yet another embodiment, the error amplifier 414 (e.g., EA) receives a reference signal 434 (e.g., internal reference voltage $V_{ref\_f}$). In one example, the error amplifier 414 (e.g., EA) the sampled signal 430 (e.g., $V_{fb\_s}$). In another example, the sampled signal 430 (e.g., $V_{fb\_s}$) is received by the inverting terminal (e.g., the "−" terminal) of the error amplifier 414. In yet another example, a non-inverting terminal (e.g., the "+" terminal) of the error amplifier 414 receives the reference signal 434. In another example, the reference signal 434 (e.g., internal reference voltage $V_{ref\_f}$) is the sum of the compensation voltage $\Delta V_{cable}$ and a reference signal 436 (e.g., reference voltage $V_{ref\_cv}$). In one embodiment, the reference signal generator 420 generates the reference signal 436 (e.g., reference voltage $V_{ref\_cv}$). For example, the error amplifier 414 (e.g., EA) generates the signal 274 (e.g., $V_{Comp}$) based on the reference signal 434 (e.g., internal reference voltage $V_{ref\_f}$) and the sampled signal 430 (e.g., $V_{fb\_s}$). In yet another example, the error amplifier 414 (e.g., EA) amplifies the difference between the reference signal 434 (e.g., internal reference voltage $V_{ref\_f}$) and the sampled signal 430 (e.g., $V_{fb\_s}$) to generate the signal 274 (e.g., $V_{comp}$). For example, the sampled signal 430 (e.g., $V_{fb\_s}$) relates to the auxiliary winding 226.

In one embodiment, the modulation component 402 (e.g., PWM/PFM control) receives the signal 274 (e.g., $V_{comp}$) from the error amplifier 414 (e.g., EA), and outputs a signal 436 to the logic control component 404 based on the signal 274 (e.g., $V_{comp}$). For example, the modulation component 402 (e.g., PWM/PFM control) controls the operating frequency and operating mode of the power converter 200.

According to another embodiment, the logic control component 404 outputs a signal 438 to the driver 406. For example, the driver 406 generates the drive signal 254 based on the signal 438 to affect the primary current 270 (e.g., $I_{pri}$). In one example, the primary current 270 (e.g., $I_{pri}$) flows through the primary winding 206. In another example, based on Equations 4 and 5, the drive signal 438 by affecting the primary current 270 (e.g., $I_{pri}$) determines the load current $I_{load}$ (e.g., the output current 264).

According to yet another embodiment, the logic control component 404 further receives signals 276 and 278 from the comparators 424 and 426 (e.g., COMP and OCP), respectively. For example, the logic control component 404 generates the signal 438 based on the signals 436, 276 and 278. In another example, the logic control component 404 generates the signal 438 based on at least the signals 276 and 278 for generating the drive signal 254 to affect the primary current 270 (e.g., $I_{pri}$).

In another embodiment, the comparator 424 (e.g., COMP) receives the signal 274 (e.g., $V_{comp}$) from the error amplifier 414 (e.g., EA). For example, the comparator 424 (e.g., COMP) receives the signal 274 (e.g., voltage $V_{comp}$) at its inverting terminal (e.g., the "−" terminal). In another example, the comparator 424 (e.g., COMP) receives the sensed signal 272 through terminal 240 (e.g., terminal CS) of the controller 202. In yet another example, the comparator 424 (e.g., COMP) receives the sensed signal 272 at its non-inverting terminal (e.g., the "+" terminal). In one embodiment, the comparator 424 (e.g., COMP) generates the signal 276 based on the sensed signal 272 and the signal 274 (e.g., $V_{comp}$).

According to another embodiment, the comparator 426 (e.g., OCP) receives a reference signal 444 (e.g., $V_{ref}$). For example, the comparator 426 (e.g., OCP) receives the reference signal 444 (e.g., $V_{ref}$) at its inverting terminal (e.g., the "−" terminal). In another example, the comparator 426 (e.g., OCP) receives the sensed signal 272 through terminal 240 (e.g., terminal CS) of the controller 202. In yet another example, the comparator 426 (e.g., OCP) receives the sensed signal 272 at its non-inverting terminal (e.g., the "+" terminal). In one embodiment, the comparator 426 (e.g., OCP) generates the signal 278 based on the sensed signal 272 and the reference signal 444 (e.g., $V_{ref}$). For example, the reference signal 444 (e.g., $V_{ref}$) is a reference voltage.).

In one example, according to the loop control theory, under stable load condition (e.g., a load condition that allows the power converter to operate at equilibrium), the relationship between $V_{fb\_s}$ and $V_{ref\_f}$ can be expressed as follows:

$$V_{fb\_s}=V_{ref\_f}=V_{ref\_cv}+\Delta v_c \quad \text{(Equation 10)}$$

In another example, $V_{fb\_s}=V_{FB}$, and based on Equations 3 and 10, the load voltage 263 (e.g., $V_{load}$) at the equipment terminal 262 can be expressed as follows:

$$V_{load} = \frac{R_2+R_3}{R_2} \times \frac{1}{N_S} \times V_{ref\_cv} + \quad \text{(Equation 11)}$$
$$\frac{R_2+R_3}{R_2} \times \frac{1}{N_S} \times \Delta V_c - I_{load} \times R_{cable} - V_d$$

For example, if $$\frac{R_2+R_3}{R_2} \times \frac{1}{N_S} \times \Delta V_c - I_{load} \times R_{cable} = 0,$$

the load voltage 263 (e.g., $V_{load}$) is well compensated and kept at a constant level. In another example, the compensation voltage $\Delta V_c$ is based on the load current hoax (e.g., the output current 264), and $\Delta V_c$ can be adjust so that the following relationship holds true:

$$\frac{R_2+R_3}{R_2} \times \frac{1}{N_S} \times \Delta V_c = I_{load} \times R_{cable}.$$

In yet another example, the adjustment of the compensation voltage $\Delta V_c$ results in changes to load voltage 263 (e.g., $V_{load}$) at the equipment terminal 262 to compensate for the drop in the load voltage 263 (e.g., the drop that is caused by the voltage drop across the diode 212 and/or caused by the output cable line 260), and to maintain the load voltage 263 (e.g., $V_{load}$) at a constant level.

Figure 5:
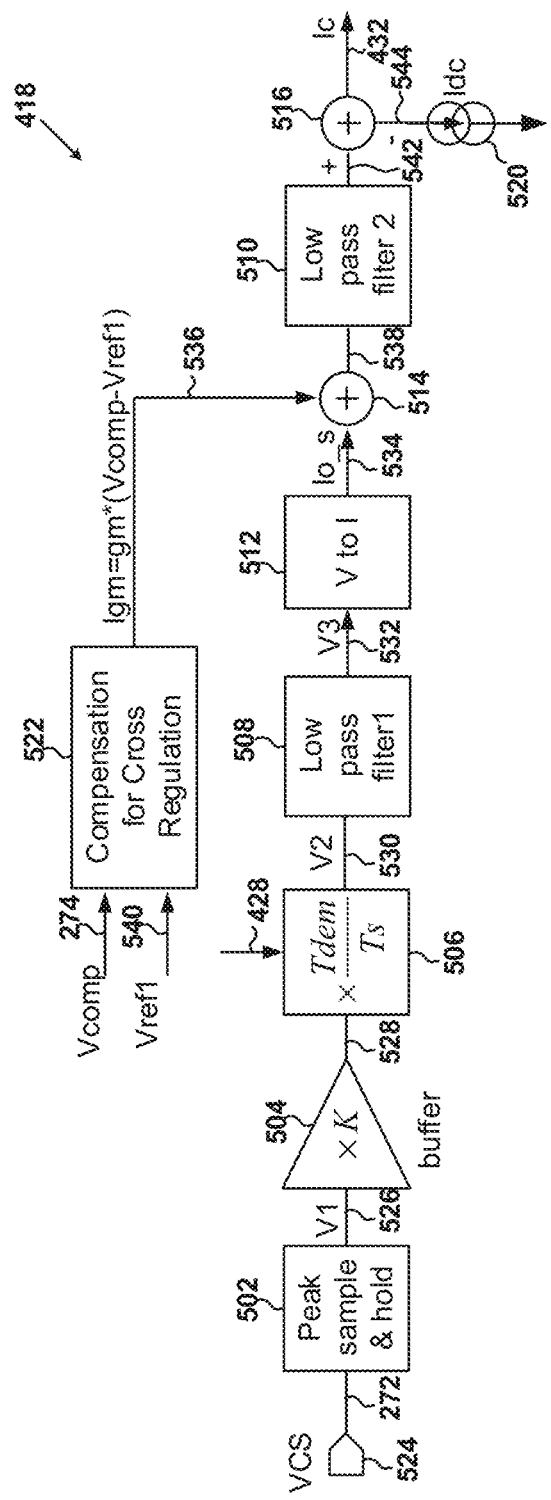
FIG. 5 is a simplified diagram showing a compensation signal generator as part of the controller as shown in FIG. 4 according to one embodiment of the present invention.

FIG. 5 is a simplified diagram showing a compensation signal generator as part of the controller 202 according to one embodiment of the present invention. This diagram is merely an example, which should not unduly limit the scope of the claims. One of ordinary skill in the art would recognize many variations, alternatives, and modifications. The compensation signal generator 418 includes a sample-and-hold signal generator 502, a buffer 504, a multiplier 506, two filters 508 and 510, a voltage-to-current converter 512, two summation components 514 and 516 (e.g., signal combiners), a current source component 520 and a cross regulation compensation component 522 (e.g., a signal generator, or a transconductance amplifier). For example, the voltage-to-current converter 512 is a voltage-to-current converter. In another example, the filters 508 and 510 are low-pass filters. In yet another example, each of the summation components 514 and 516 is an adder, a subtractor, or a multiplexer. In yet another example, the summation components 514 is an adder. In yet another example, the summation components 516 is a subtractor. In yet another example, the current source component 520 is a constant-current source.

According to one embodiment, the sample-and-hold signal generator 502 samples and holds the sensed signal 272 (e.g., voltage $V_{CS}$) from the terminal 524 (e.g., terminal VCS) of the compensation signal generator 418, and generates the signal 526 (e.g., V1) based on the sensed signal 272. For example, the signal 526 (e.g., V1) represents the peak voltage of the sensed signal 272 (e.g., voltage $V_{CS}$), which corresponds to a peak current of the primary current 270 (e.g., $I_{pri}$). In another example, the buffer 504 receives the signal 526 and generates a buffered signal 528 based on the signal 526. In yet another example, the multiplier 506 receives the buffered signal 528 and the demagnetization signal 428, and generates a signal 530 (e.g., V2) based on the buffered signal 530 and the demagnetization signal 428. For example, the magnitude V2 of signal 530 can be expressed as follows:

$$V_2 = K \times V_{CS} \times \frac{T_{dem}}{T_s} \qquad \text{(Equation 12)}$$

where K is a magnification constant based on the buffer 504.

According to another embodiment, the signal 530 (e.g., V2) flows from the multiplier 506 to the filter 508, which generates a signal 532 (e.g., V3) based on the signal 530. For example, the filter 508 filters out high-frequency components of signal 530 (e.g., V2). In another example, the signal 532 (e.g., V3) represent a direct-current (DC) component of the signal 530 (e.g., V2). In yet another example, the signal 532 (e.g., V3) is converted to a signal 534 (e.g., $I_{o\_s}$) by the voltage-to-current converter 512. In one example, the signal 534 (e.g., $I_{o\_s}$) is a current. In another example, the summation component 514 receives the signal 534 (e.g., $I_{o\_s}$) and a signal 536 (e.g., $I_{gm}$), and generates a signal 538. In one embodiment, the signal 536 (e.g., $I_{gm}$) is a current. For example, the signal 538 is the sum of signal 534 and the signal 536. In another example, the signal 538 is the sum of two currents (e.g., $I_{o\_s}+I_{gm}$). In yet another example, based on Equations 8 and 12, the magnitude of the signal 534 (e.g., $I_{o\_s}$) can be expressed as follows:

$$I_{o\_s} = \frac{V_3}{R} = \frac{K}{R} \times V_{CS} \times \frac{T_{dem}}{T_s} \propto I_{load} \qquad \text{(Equation 13)}$$

where R is a resistance based on the voltage-to-current converter 512. For example, K and R can be kept at a constant level, and signal 534 (e.g., $I_{o\_s}$) corresponds to the load current $I_{load}$ (e.g., the output current 264). In another example, signal 534 (e.g., $I_{o\_s}$) is proportional (e.g., linearly) to the load current $I_{load}$ (e.g., the output current 264). In yet another example, signal 534 (e.g., $I_{o\_s}$) can be used to adjust the load voltage 263 (e.g., $V_{load}$) at the equipment terminal 262, and to compensate for the drop in the load voltage 263 (e.g., the drop that is caused by the voltage drop across the diode 212 and/or caused by the output cable line 260).

Figure 6:
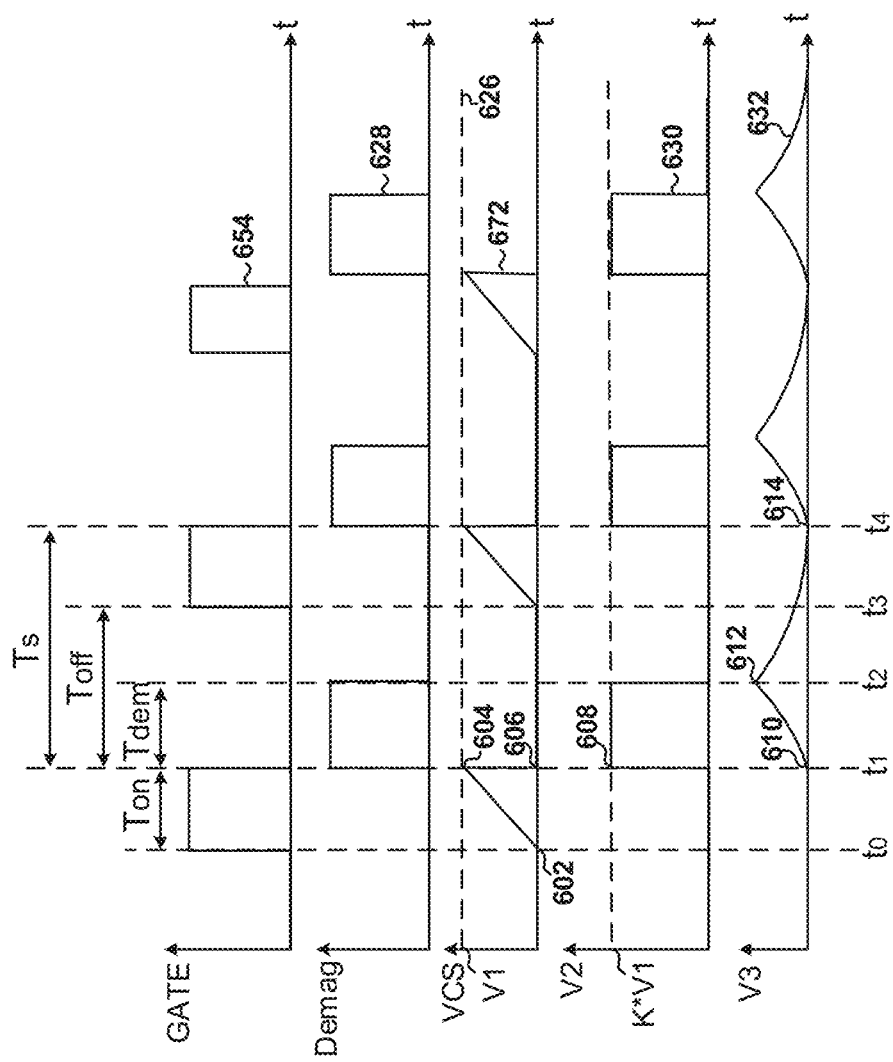
FIG. 6 is a simplified timing diagram for the compensation signal generator as shown in FIG. 5 according to one embodiment of the present invention.

FIG. 6 is a simplified timing diagram for the compensation signal generator 418 according to one embodiment of the present invention. This diagram is merely an example, which should not unduly limit the scope of the claims. One of ordinary skill in the art would recognize many variations, alternatives, and modifications. In one embodiment, the waveform 654 represents the drive signal 254 as a function of time. For example, the waveform 654 indicates the turned-on and turned-off conditions of the switch 210 as a function of time. In another embodiment, the waveform 628 represents the demagnetization signal 428 generated by the demagnetization detector 408 as a function of time. In yet another embodiment, the waveform 626 represents the signal 526 (e.g., V1) as a function of time. According to one embodiment, the waveform 672 represents the sensed signal 272 (e.g., voltage $V_{CS}$) as a function of time. In another embodiment, the waveform 630 represents the signal 530 (e.g., V2) as a function of time. In yet another embodiment, the waveform 632 represents the signal 532 (e.g., V3) as a function of time. For example, if the waveform 654 is at a logic high level, the switch 210 is closed (e.g., turned on), and if the waveform 654 is at a logic low level, the switch 210 is open (e.g., turned off).

According to one embodiment, four time periods $T_{on}$, $T_{off}$, $T_{dem}$, and $T_s$ are shown in FIG. 6. In one example, the time period $T_{on}$ starts at time to and ends at time $t_1$, and the time period $T_{off}$ starts at time $t_1$ and ends at time $t_3$. In another example, the time period $T_{dem}$ starts at the time $t_1$ and ends at time $t_2$, and the time period $T_s$ starts at the time $t_1$ and ends at the time $t_4$. For example, $t_0 \le t_1 \le t_2 \le t_3 \le t_4$. In another example, the time period $T_{dem}$ represents the signal pulse width of the demagnetization signal 428, and is within the time period $T_{off}$. In yet another example, the time period $T_s$ (e.g., switching period) is the signal period of the demagnetization signal 428, and includes the time period $T_{dem}$ (e.g., demagnetization period).

According to another embodiment, during a time period (e.g., $T_{on}$) when the switch 210 is closed (e.g., on), the sensed signal 272 (e.g., voltage $V_{CS}$) increases from a low value (e.g., the value 602 that is, for example, approximately zero at $t_0$) to a peak value (e.g., the peak-voltage value 604 at $t_1$) as shown by the waveform 672. In one example, at a time (e.g., $t_1$) when the switch 210 changes from closed (e.g., turned on) to open (e.g., turned off), the sensed signal 272 (e.g., voltage $V_{CS}$) decreases from the peak value (e.g., the peak-voltage value 604 at $t_1$) to a low value (e.g., the value 606 that is, for example, approximately zero at $t_1$) as shown by the waveform 672. In another example, the signal 526 (e.g., V1) is approximately constant in magnitude as shown by the waveform 626. In yet another example, the signal 526 (e.g., V1) represents the peak-voltage value 604 as shown by waveforms 626 and 672. In one example, at a time (e.g., $t_1$) when the switch 210 changes from closed (e.g., turned on) to open (e.g., turned off), the signal 530 (e.g., V2) increases from a low value (e.g., approximately zero) to a high value (e.g., the value 608 that is, for example, equal to $K \times V_1$) as shown by waveform 630. In yet another example, during a time period (e.g., $T_{dem}$) the signal 530 (e.g., V2) keeps a high value (e.g., the value 608 that is, for example, equal to $K \times V_1$) as shown by the waveform 630. In yet another example, at a time (e.g., $t_2$) the signal 530 (e.g., V2) decreases from a high value (e.g., the value 608 that is, for example, equal to $K \times V_1$) to a low value (e.g., approximately zero) as shown by the waveform 630. In yet another example, during a time period (e.g., the time period from $t_2$ to $t_4$) the signal 530 (e.g., V2) keeps a low value (e.g., approximately zero) as shown by waveform 630. In one example, during a time period (e.g., $T_{dem}$) the signal 532 (e.g., V3) increases from a low value (e.g., the value 610 at $t_1$) to a high value (e.g., the value 612 at $t_2$) as shown by the waveform 632. For example, during a time period (e.g., the time period from $t_2$ to $t_4$) the signal 532 (e.g., V3) decreases from a high value (e.g., the value 612 at $t_2$) to a low value (e.g., the value 614 at $t_4$) as shown by the waveform 632.

Referring back to FIG. 2, according to one embodiment, the controller 202 is powered via the auxiliary winding 226 through the voltage provided at the terminal 236 (e.g., terminal VCC). Hence, the controller 202 itself draws a current, which represents a load of the power converter 200. If the load current 265 (e.g., the output current 264) is small or there is no load connected to the equipment terminal 262 of the power converter 200, the current drawn by the controller 202 is not negligible. In this case, the secondary winding 208 and the auxiliary winding 226 exhibit cross regulation that can result in the controller 202 being unable to regulate the load voltage 263 (e.g., $V_{load}$), and the load voltage 263 (e.g., $V_{load}$) becoming uncontrollably high, if the cross regulation is not compensated for. In one embodiment, the controller 202 compensates for cross regulation (e.g., at a no-load condition or a light-load condition) as part of segment II of the compensation scheme. For example, the controller 202 receives the feedback signal 268 and the sensed signal 272 (e.g., voltage $V_{CS}$), and generates the signal 274 (e.g., $V_{comp}$) based on the feedback signal and the sensed signal 272 (e.g., voltage $V_{CS}$) in order to compensate for cross regulation.

As shown in FIG. 5, according to another embodiment, the cross regulation compensation component 522 receives the signal 274 (e.g., $V_{comp}$) and a reference signal 540 (e.g., $V_{ref1}$). For example, the cross regulation compensation component 522 determines the difference between the signal 274 (e.g., $V_{comp}$) and the reference signal 540 (e.g., $V_{ref1}$), and outputs the signal 536 (e.g., $I_{gm}$) to the summation component 514. In yet another example, the signal 536 (e.g., $I_{gm}$) is a current. In another example, the magnitude of the signal 536 (e.g., $I_{gm}$) can be determined as follows:

$$I_{gm}=gm \times (V_{comp}-V_{ref1}) \quad \text{(Equation 14)}$$

where gm is a constant transconductance value (e.g., an amplification value) of the cross regulation compensation component 522. For example, the signal 536 (e.g., $I_{gm}$) increases in magnitude if the signal 274 (e.g., $V_{comp}$) increases in magnitude. In another example, the signal 536 (e.g., $I_{gm}$) is clamped at a constant value (e.g., $I_{dc}$) if the signal 536 (e.g., $I_{gm}$) becomes too high (e.g., exceeds a predetermined threshold value).

In another embodiment, the summation component 514 receives the signal 534 (e.g., $I_{o\_s}$) and the signal 536 (e.g., $I_{gm}$), and generates the signal 538. For example, the signal 538 is the sum of signal 534 and the signal 536. In another example, the signal 538 flows from the summation component 514 to the filter 510, and the filter 510 generates the signal 542 that is received by the summation component 516. In yet another example, the summation component 516 further receives the signal 544 (e.g., $I_{dc}$) from the current source component 520, and generates the compensation signal 432 (e.g., $I_c$) based on the signal 542 and the signal 544 (e.g., $I_{dc}$). In yet another example, the summation component 516 subtracts the signal 542 from signal 544 (e.g., $I_{dc}$) to generate the compensation signal 432 (e.g., $I_c$). In yet another example, the magnitude of the compensation signal 432 (e.g., $I_c$) can be determined as follows:

$$I_c=I_{gm}+I_{o\_s}-I_{dc} \quad \text{(Equation 15)}$$

Figure 7:
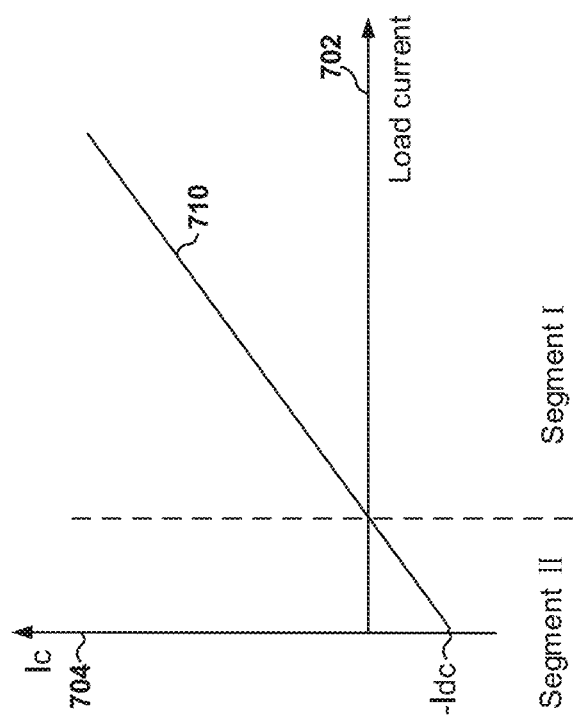
FIG. 7 is a simplified diagram showing a compensation signal as a function of a load current as shown in FIGS. 2 and 5 according to certain embodiments of the present invention.

FIG. 7 is a simplified diagram showing the compensation signal as a function of the load current according to certain embodiments of the present invention. This diagram is merely an example, which should not unduly limit the scope of the claims. One of ordinary skill in the art would recognize many variations, alternatives, and modifications. The axis 702 represents the load current 265 (e.g., $I_{load}$), and the axis 704 represents the compensation signal 432 (e.g., $I_c$). Additionally, the line 710 represents the compensation signal 432 as a function of the load current 265 (e.g., $I_{load}$). For example, the load current 265 (e.g., $I_{load}$) is the output current 264 (e.g., $I_{out}$).

In one example, when the power converter is operating at a no-load condition, the signal 536 (e.g., $I_{gm}$) and the signal 534 (e.g., $I_{o\_s}$) are both zero in magnitude, and, based on Equation 15, the compensation signal 432 (e.g., $I_c$) can be determined as follows: $I_c=-I_{dc}$. In this example, the reference signal 436 (e.g., reference voltage $V_{ref\_cv}$) is negatively compensated, and, based on Equation 9, the compensation voltage $\Delta V_c$ can be determined as follows: $\Delta V_c=-I_{dc} \times R_c$. At this load condition, for example, the output voltage is reduced, and the impact of the cross regulation is compensated for with segment II of the compensation scheme.

In another example, when the power converter is operating at a low-load condition, the signal 536 (e.g., $I_{gm}$) and the signal 534 (e.g., $I_{o\_s}$) are close to zero in magnitude or small in magnitude. In this example, the reference signal 436 (e.g., reference voltage $V_{ref\_cv}$) is also negatively compensated. At this load condition, for example, the output voltage is reduced, and the impact of the cross regulation is compensated for with segment II of the compensation scheme.

In yet another example, when the power converter is operating at a load that results in $I_{gm}+I_{o\_s}=I_{dc}$, based on Equation 15, the compensation signal 432 (e.g., $I_c$) is zero in magnitude. For example, based on Equation 9, the compensation voltage $\Delta V_c$ is also zero in magnitude. At this load condition, for example, little or no compensation is provided.

According to another example, when the load increases, the signal 274 (e.g., $V_{comp}$) increases in magnitude, and, in turn, the signal 536 (e.g., $I_{gm}$) increases in magnitude. If, for example, the signal 536 (e.g., $I_{gm}$) becomes too high (e.g., exceeds a predetermined threshold value), the signal 536 (e.g., $I_{gm}$) is clamped at a constant value (e.g., $I_{dc}$) so that $I_{gm}=I_{dc}$. In another example, based on Equation 15, the compensation signal 432 (e.g., $I_c$) can be determined as follows: $I_c=I_{o\_s}$, and, for example, based on Equation 9, the compensation voltage $\Delta V_c$ is: $\Delta V_c=I_{o\_s} \times R_c$. In yet another example, based on Equation 13, the compensation signal 432 (e.g., $I_c$) is proportional (e.g., linearly) to the load current 265 (e.g., the output current 264), and the compensation voltage $\Delta V_c$ is proportional (e.g., linearly) to the load current 265 (e.g., the output current 264). At this load condition (e.g., at a high-load condition), for example, the drop in the load voltage 263 (e.g., the drop that is caused by the voltage drop across the diode 212 and/or caused by the output cable line 260) is compensated for with segment I of the compensation scheme, and based on Equation 11, the load voltage 263 (e.g., $V_{load}$) can be maintained at a constant level.

Figure 8:
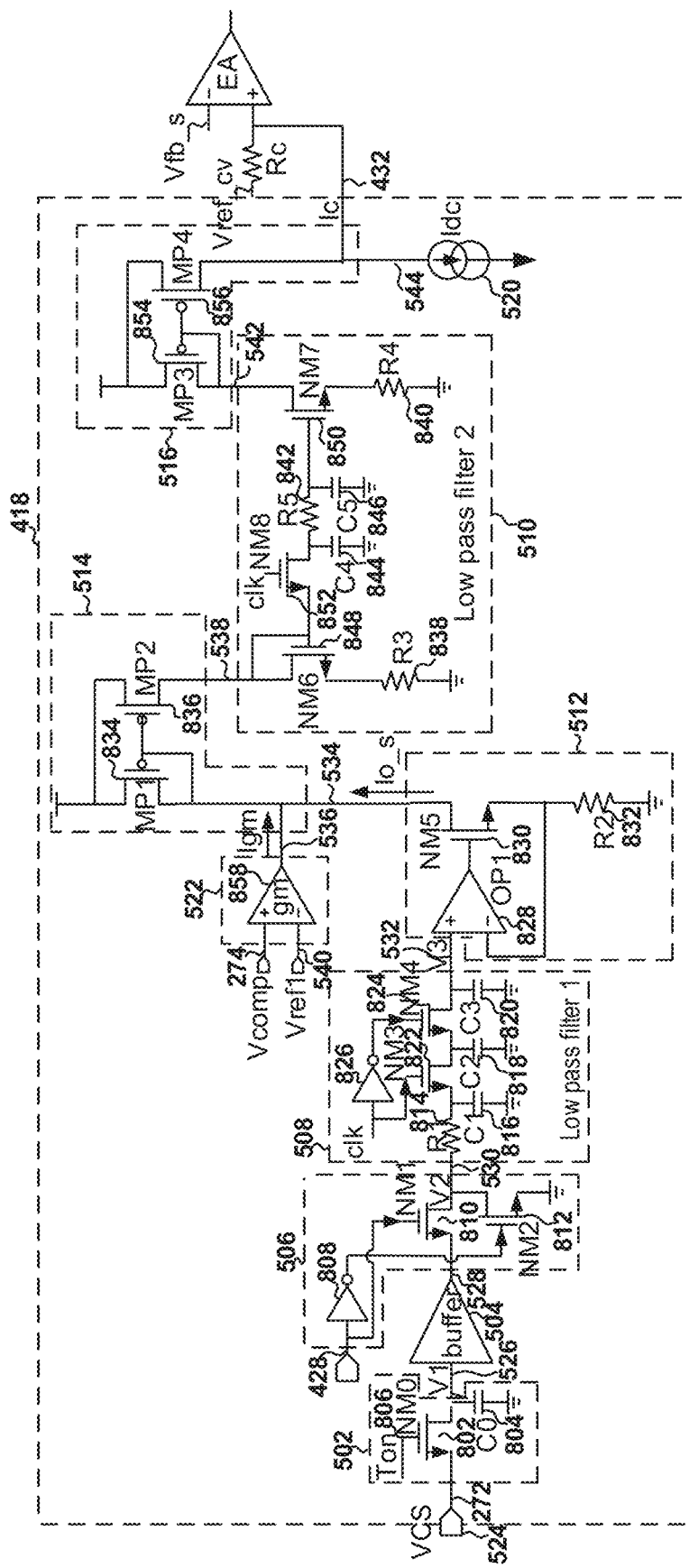
FIG. 8 is a simplified diagram showing certain components of the compensation signal generator as shown in FIG. 5 according to another embodiment of the present invention.

FIG. 8 is a simplified diagram showing certain components of the compensation signal generator 418 according to another embodiment of the present invention. This diagram is merely an example, which should not unduly limit the scope of the claims. One of ordinary skill in the art would recognize many variations, alternatives, and modifications. The compensation signal generator 418 includes the sample-and-hold signal generator 502, the buffer 504, the multiplier 506, the filters 508 and 510, the voltage-to-current converter 512, the summation components 514 and 516, the current source component 520 and the signal generator 522. For example, the voltage-to-current converter 512 is a voltage-to-current converter. In another example, the filters 508 and 510 are low-pass filters. In yet another example, each of the summation components 514 and 516 is an adder, a subtractor, or a multiplexer. In yet another example, the summation component 514 is an adder. In yet another example, the summation components 516 is a subtractor. In yet another example, the current source component 520 is a constant-current source.

According to one embodiment, the sample-and-hold signal generator 502 includes a switch 802 (e.g., NM0) and a capacitor 804 (e.g., C0). For example, the switch 802 (e.g., NM0) is a transistor. In another example, the sample-and-hold signal generator 502 samples and holds the sensed signal 272 (e.g., voltage $V_{CS}$) from terminal 524 (e.g., terminal VCS) of the compensation signal generator 418, and generates the signal 526 (e.g., V1) based on the sensed signal 272. In yet another example, the switch 802 samples the sensed signal 272 (e.g., voltage $V_{CS}$) in response to signal 806 (e.g., $T_{on}$), and the capacitor 804 (e.g., C0) holds the signal 526 (e.g., V1). In yet another example, the signal 526 (e.g., V1) represents the peak voltage of the sensed signal 272 (e.g., voltage $V_{CS}$). In yet another example, the buffer 504 receives the signal 526 (e.g., V1), and generates the buffered signal 528 based on the signal 526. In yet another example, the buffer 504 generates the buffered signal 528 (e.g., K×V1) by amplifying the signal 526 (e.g., V1) K times.

According to another embodiment, the multiplier 506 includes an inverter 808 (e.g., NOT gate) and two switches 810 and 812 (e.g., NM1 and NM2). For example, each of the switches 810 and 812 (e.g., NM1 and NM2) is a transistor. In another example, the multiplier 506 receives the buffered signal 528 and the demagnetization signal 428, and generates the signal 530 (e.g., V2) based on the buffered signal 528 and the demagnetization signal 428. In yet another example, the multiplier 506 processes the demagnetization signal 428 and determines on-sets (e.g., rising edges) of two consecutive demagnetization periods (e.g., two consecutive $T_{dem}$) in order to determine a switching period (e.g., $T_s$).

In yet another example, the switch 810 (e.g., NM1) is closed (e.g., turned on) if the demagnetization signal 428 is at a logic high level. In yet another example, the switch 812 (e.g., NM2) is closed (e.g., turned on) if the demagnetization signal 428 is at a logic low level. In yet another example, the switch 810 (e.g., NM1) is open (e.g., turned off) if the demagnetization signal 428 is at a logic low level. In yet another example, the switch 812 (e.g., NM2) is open (e.g., turned off) if the demagnetization signal 428 is at a logic high level. In yet another example, the signal 530 (e.g., V2) is a pulse wave including a high value (e.g., K×$V_1$, where $V_1$ is the peak voltage of $V_{CS}$) and a low value (e.g., approximately zero). In yet another example, the duty cycle of the signal 530 (e.g., V2) is identical to the duty cycle of the demagnetization signal 428.

According to another embodiment, the filter 508 includes a resistor 814 (e.g., R1), three capacitors 816, 818, and 820 (e.g., C1, C1, and C3), two switches 822 and 824 (e.g., NM3 and NM4), and an inverter 826 (e.g., NOT gate). For example, each of the switches 822 and 824 (e.g., NM3 and NM4) is a transistor. In another example, the signal 530 (e.g., V2) flows from the multiplier 506 to the filter 508, which generates the signal 532 (e.g., V3) based on the signal 530. In yet another example, the filter 508 filters out high-frequency components of signal 530 (e.g., V2). In another example, the signal 532 (e.g., V3) represent a direct-current (DC) component of the signal 530 (e.g., V2).

According to yet another embodiment, the voltage-to-current converter 512 includes an amplifier 828 (e.g., OP1), a switch 830 (e.g., NM5), and a resistor 832 (e.g., R2). For example, the amplifier 828 (e.g., OP1) is an operational amplifier. In another example, the switch 830 (e.g., NM5) is a transistor. In yet another example, the signal 532 (e.g., V3) is converted to the signal 534 (e.g., $I_{o\_s}$) by the voltage-to-current converter 512. In yet another example, the signal 534 (e.g., $I_{o\_s}$) is a current.

According to yet another embodiment, the summation component 514 includes two switches 834 and 836 (e.g., MP1 and MP2). For example, each of the switches 834 and 836 (e.g., MP1 and MP2) is a transistor. In another example, the summation component 514 receives the signal 534 (e.g., $I_{o\_s}$) and the signal 536 (e.g., $I_{gm}$), and generates the signal 538. In yet another example, the signal 536 (e.g., $I_{gm}$) is a current. In yet another example, the signal 538 is the sum of signal 534 and the signal 536. In one example, the signal 534 (e.g., $I_{o\_s}$) and the signal 536 (e.g., $I_{gm}$) are added by the switch 834 (e.g., MP1), and transferred to the filter 510 via the switch 836 (e.g., MP2).

According to yet another embodiment, the filter 510 includes three resistors 838, 840, and 842 (e.g., R3, R4, and R5), two capacitors 844, and 846 (e.g., C4, and C5), and three switches 848, 850, and 852 (e.g., NM6, NM7, and NM8). For example, each of the switches 848, 850, and 852 (e.g., NM6, NM7, and NM8) is a transistor. In another example, the filter 510 receives the signal 538 from the summation component 514. In yet another example, the filter 510 generates the signal 542 based on the signal 538, and outputs the signal 542 to the summation component 516, which includes two switches 854, and 856 (e.g., MP3, and MP4). In yet another example, each of the switches 854, and 856 (e.g., MP3, and MP4) is a transistor. In yet another example, the summation component 516 further receives the signal 544 (e.g., $I_{dc}$) from the current source component 520, and generates the compensation signal 432 (e.g., $I_c$) based on the signal 542 and the signal 544 (e.g., $I_{dc}$). In yet another example, the summation component 516 subtracts the signal 542 from signal 544 (e.g., $I_{dc}$) to generate the compensation signal 432 (e.g., $I_c$).

According to yet another embodiment, the cross regulation compensation component 522 includes an amplifier 858 (e.g., gm). For example, the amplifier 858 is a transconductance amplifier. In another example, the amplifier 858 receives the signal 274 (e.g., $V_{comp}$) at its non-inverting terminal (e.g., the "+" terminal). In yet another example, the amplifier 858 receives the reference signal 540 (e.g., $V_{ref1}$) at its inverting terminal (e.g., the "−" terminal). In yet another example, the cross regulation compensation component 522 determines the difference between the signal 274 (e.g., $V_{comp}$) and the reference signal 540 (e.g., $V_{ref1}$), and outputs the signal 538 (e.g., $I_{gm}$) to the summation component 514.

In some embodiments, the compensation signal generator 418 as shown in FIG. 8 operates according to the simplified timing diagram as shown in FIG. 6. In certain embodiments, the compensation signal 432 (e.g., $I_c$) as shown in FIG. 8 is a function of the load current 265 (e.g., the output current 264) as shown in FIG. 7.

According to one embodiment, a system controller for regulating a power converter includes a first controller terminal; a second controller terminal; and a compensation current generator. The compensation current generator is configured to receive an input signal through the first controller terminal. The input signal indicates a first current flowing through a primary winding of a power converter. The compensation current generator is configured to receive a demagnetization signal related to a demagnetization period of the power converter and associated with an auxiliary winding of the power converter. The compensation current generator is configured to generate a compensation current based at least in part on the input signal and the demagnetization signal. The compensation current generator is connected to a resistor. The resistor is configured to generate a compensation voltage based at least in part on the compensation current and output a first reference voltage based at least in part on the compensation voltage and a second reference voltage. The system controller is configured to: generate an amplified signal based at least in part on the second reference voltage; generate a drive signal based at least in part on the amplified signal; and output the drive signal through the second controller terminal to a switch to affect the first current flowing through the primary winding of the power converter. For example, the system controller is implemented according to at least FIG. 3, and/or FIG. 4.

In some examples, the first reference voltage is equal to a sum of the compensation voltage and the second reference voltage. In certain examples, the system controller is further configured to generate the amplified signal based at least in part on the second reference voltage and a sampled signal related to the auxiliary winding of the power converter. For example, the system controller further includes: an error amplifier configured to receive the sampled signal and a second reference signal and generate the amplified signal based at least in part on the sampled signal and the second reference signal. As an example, the error amplifier is further configured to receive the sampled signal at an inverting terminal and the second reference signal at a non-inverting terminal.

In other examples, the system controller further includes: a demagnetization detector configured to receive a feedback signal related to the auxiliary winding of the power converter and generate the demagnetization signal based at least in part on the feedback signal. For example, the system controller further includes: a sample-and-hold circuit configured to sample the feedback signal and output a sampled signal based at least in part on the feedback signal. In some examples, the system controller further includes: a comparator configured to receive the amplified signal and the input signal and generate a comparison signal. The system controller is further configured to generate the drive signal based at least in part on the comparison signal. In certain examples, the compensation current generator is configured to receive the amplified signal and generate the compensation current based at least in part on the amplified signal.

In other examples, the compensation current generator is further configured to generate the compensation current so that an output voltage of the power converter is independent of an output current of the power converter, the output voltage and the output current being related to a secondary winding of the power converter coupled to the primary winding. In some examples, the compensation current generator is further configured to generate the compensation current to keep an output voltage of the power converter at a constant level under one or more load conditions of the power converter. For example, the one or more load conditions include a no-load condition or a low-load condition. As an example, the one or more load conditions include a high condition.

According to another embodiment, a system controller for regulating a power converter includes: a sample-and-hold signal generator; a multiplier; and a first filter. The sample-and-hold signal generator is configured to receive a first input signal and generate a sampled-and-held signal based at least in part on the first input signal. The first input signal indicates a first current flowing through a primary winding of a power converter. The sampled-and-held signal represents a peak of the first current. The multiplier is configured to receive a demagnetization signal and generate a multiplication signal based on at least information associated with the demagnetization signal and the sampled-and-held signal. The demagnetization signal is related to a demagnetization period of the power converter and is associated with an auxiliary winding of the power converter. The first filter is configured to receive the multiplication signal and generate a first filtered signal based at least in part on the multiplication signal. The first filtered signal is related to a drive signal outputted to a switch to affect the first current flowing through the primary winding of the power converter. For example, the system controller is implemented according to at least FIG. 5, FIG. 6, and/or FIG. 8.

In some examples, the system controller further includes: a buffer configured to receive the sampled-and-held signal and generate a buffered signal. The multiplier is further configured to: receive the buffered signal; and generate the multiplication signal based on the buffered signal and the demagnetization signal. In certain examples, the system controller includes: a voltage-to-current converter configured to receive the first filtered signal and generate a second current; and a first signal combiner configured to receive the second current and a third current and generate a summation signal based at least in part on the second current and the third current. For example, the system controller further includes: a second filter configured to receive the summation signal and generate a second filtered signal based at least in part on the summation signal; a current source configured to generate a constant current; and a second signal combiner configured to receive the second filtered signal and the constant current and output a compensation current to generate the drive signal. As an example, the second signal combiner is further configured to subtract the second filtered signal from the constant current to generate the compensation current.

In certain examples, the system controller further includes: a transconductance amplifier configured to receive a second input signal and a reference signal and generate the third current. The third current is equal to an amplification value multiplied by a difference between the second input signal and the reference signal. For example, the third current is equal to the amplification value multiplied by a subtraction result. The subtraction result is equal to the second input signal minus the reference signal. As an example, the system controller further includes: an error amplifier configured to generate a second input signal based on at least information associated with a compensation current. The system controller is configured to: generate the drive signal based on at least information associated with the second input signal. In one example, the error amplifier is further configured to generate the second input signal based at least in part on a sampled signal associated with the auxiliary winding and a reference signal related to the compensation current.

In other examples, the system controller further includes: a second filter configured to generate a second filtered signal based on at least information associated with the first filtered signal. The second filtered signal is related to the drive signal. In some examples, the system controller is configured to generate a compensation current based at least in part on the first filtered signal so that an output voltage of the power converter is independent of an output current of the power converter, the output voltage and the output current being related to a secondary winding of the power converter coupled to the primary winding. In certain examples, the system controller is further configured to generate a compensation current based at least in part on the first filtered signal to keep an output voltage of the power converter at a constant level under one or more load conditions of the power converter. For example, the one or more load conditions include a no-load condition or a low-load condition. As an example, the one or more load conditions include a high condition.

According to yet another embodiment, a system controller for regulating a power converter includes: a signal generator; and an error amplifier. The signal generator is configured to receive an input signal and a reference signal and output an output signal to generate a drive signal. The output signal is equal to an amplification value multiplied by a difference between the input signal and the reference signal. The error amplifier is configured to generate the input signal based on at least information associated with the output signal. The system controller is configured to: generate the drive signal based on at least information associated with the input signal; and output the drive signal to a switch of a power converter to affect a current flowing through a primary winding of the power converter. For example, the system controller is implemented according to at least FIG. 5, FIG. 6, and/or FIG. 8.

In some examples, the output signal is equal to the amplification value multiplied by a subtraction result. The subtraction result is equal to the input signal minus the reference signal. In certain examples, the output signal is related to a compensation current. For example, the error amplifier is further configured to generate the input signal based on at least information associated with the compensation current. As an example, the error amplifier is further configured to receive a sampled signal associated with an auxiliary winding of the power converter and generate the input signal based on at least information associated with the compensation current and the sampled signal. In other examples, the system controller further includes: a filter configured to generate a filtered signal based on at least information associated with the output signal. The system controller is further configured to: generate the drive signal based on at least information associated with the filtered signal. In some examples, the system controller is configured to generate a compensation current based at least in part on the output signal so that an output voltage of the power converter is independent of an output current of the power converter, the output voltage and the output current being related to a secondary winding of the power converter coupled to the primary winding.

In certain examples, the system controller is further configured to generate a compensation current based at least in part on the output signal to keep an output voltage of the power converter at a constant level under one or more load conditions of the power converter. For example, the one or more load conditions include a no-load condition or a low-load condition. As an example, the one or more load conditions include a high condition.

According to yet another embodiment, a system controller for regulating a power converter includes: a first controller terminal; a second controller terminal; a compensation current generator; and an error amplifier. The compensation current generator is configured to: receive an input signal through the first controller terminal. The input signal indicates a first current flowing through a primary winding of a power converter. The compensation current generator is configured to: receive an amplified signal; and generate a compensation current based at least in part on the input signal and the amplified signal. The error amplifier is configured to: generate the amplified signal based on at least information associated with the compensation current; output the amplified signal to the compensation current generator; and output the amplified signal to generate a drive signal outputted through the second controller terminal to a switch to affect the first current flowing through the primary winding of the power converter. For example, the system controller is implemented according to at least FIG. 3, and/or FIG. 4.

In some examples, the error amplifier is further configured to receive a sampled signal associated with an auxiliary winding of the power converter and generate the amplified signal based at least in part on the sampled signal. For example, the system controller further includes: a demagnetization detector configured to receive a feedback signal related to the auxiliary winding and generate a demagnetization signal based at least in part on the feedback signal. As an example, the compensation current generator is configured to receive the demagnetization signal and generate the compensation current based at least in part on the input signal and the demagnetization signal. In one example, the system controller further includes: a sample-and-hold circuit configured to sample the feedback signal and output the sampled signal based at least in part on the feedback signal.

In certain examples, the system controller further includes: a comparator configured to receive the amplified signal and the input signal and generate a comparison signal. The system controller is further configured to generate the drive signal based at least in part on the comparison signal. In other examples, the compensation current generator is further configured to generate the compensation current so that an output voltage of the power converter is independent of an output current of the power converter, the output voltage and the output current being related to a secondary winding of the power converter coupled to the primary winding. In some examples, the compensation current generator is further configured to generate the compensation current to keep an output voltage of the power converter at a constant level under one or more load conditions of the power converter. For example, the one or more load conditions include a no-load condition or a low-load condition. As an example, the one or more load conditions include a high condition.

According to yet another embodiment, a system controller for regulating a power converter includes: a first controller terminal; a second controller terminal; a compensation current generator; and an error amplifier. The compensation current generator is configured to: receive an input signal through the first controller terminal. The input signal indicates a first current flowing through a primary winding of a power converter. The compensation current generator is configured to: receive a demagnetization signal related to a demagnetization period of the power converter and associated with an auxiliary winding of the power converter; receive an amplified signal; in response to the power converter operating under a first load condition, generate a compensation current based at least in part on the input signal and the amplified signal; and in response to the power converter operating under a second load condition, generate the compensation current based at least in part on the input signal and the demagnetization signal. The error amplifier is configured to: generate the amplified signal based on at least information associated with the compensation current; output the amplified signal to the compensation current generator; and output the amplified signal to generate a drive signal outputted through the second controller terminal to a switch to affect the first current flowing through the primary winding of the power converter. The first load condition and the second load condition are different. For example, the system controller is implemented according to at least FIG. 3, FIG. 4 and/or FIG. 7.

In some examples, the system controller further includes: a demagnetization detector configured to receive a feedback signal related to the auxiliary winding and generate the demagnetization signal based at least in part on the feedback signal. For example, the error amplifier is further configured to receive a sampled signal associated with the feedback signal and generate the amplified signal based at least in part on the sampled signal. In certain examples, the compensation current generator is further configured to generate the compensation current to keep an output voltage of the power converter at a constant level under the first load condition and the second load condition. In other examples, the first load condition includes a no-load condition or a low-load condition. In some examples, the second load condition includes a high-load condition.

According to yet another embodiment, a method for regulating a power converter includes: receiving an input signal. The input signal indicates a first current flowing through a primary winding of a power converter. The method includes: receiving a demagnetization signal related to a demagnetization period of the power converter and associated with an auxiliary winding of the power converter; generating a compensation current based at least in part on the input signal and the demagnetization signal; generating a compensation voltage based at least in part on the compensation current; outputting a first reference voltage based at least in part on the compensation voltage and a second reference voltage; generating an amplified signal based at least in part on the second reference voltage; generating a drive signal based at least in part on the amplified signal; and outputting the drive signal to a switch to affect the first current flowing through the primary winding of the power converter. For example, the method is implemented according to at least FIG. 3 and/or FIG. 4.

According to yet another embodiment, a method for regulating a power converter includes: receiving an input signal. The input signal indicates a current flowing through a primary winding of a power converter. The method includes: generating a sampled-and-held signal based at least in part on the input signal. The sampled-and-held signal represents a peak of the current. The method includes: receiving a demagnetization signal; and generating a multiplication signal based on at least information associated with the demagnetization signal and the sampled-and-held signal. The demagnetization signal is related to a demagnetization period of the power converter and is associated with an auxiliary winding of the power converter. The method includes: receiving the multiplication signal; and generating a filtered signal based at least in part on the multiplication signal. The filtered signal is related to a drive signal. The method includes: outputting the drive signal to a switch to affect the current flowing through the primary winding of the power converter. For example, the method is implemented according to at least FIG. 5, FIG. 6, and/or FIG. 8.

According to yet another embodiment, a method for regulating a power converter includes: receiving an input signal and a reference signal; and outputting an output signal to generate a drive signal. The output signal is equal to an amplification value multiplied by a difference between the input signal and the reference signal. The method includes: generating the input signal based on at least information associated with the output signal; generating the drive signal based on at least information associated with the input signal; and outputting the drive signal to a switch of a power converter to affect a current flowing through a primary winding of the power converter. For example, the method is implemented according to at least FIG. 5, FIG. 6, and/or FIG. 8.

According to yet another embodiment, a method for regulating a power converter includes: receiving an input signal. The input signal indicates a first current flowing through a primary winding of a power converter. The method includes: receiving an amplified signal; generating a compensation current based at least in part on the input signal and the amplified signal; generating the amplified signal based on at least information associated with the compensation current; generating a drive signal based at least in part on the amplified signal; and outputting the drive signal to a switch to affect the first current flowing through the primary winding of the power converter. For example, the method is implemented according to at least FIG. 3, and/or FIG. 4.

According to yet another embodiment, a method for regulating a power converter includes: receiving an input signal. The input signal indicates a first current flowing through a primary winding of a power converter. The method includes: receiving a demagnetization signal related to a demagnetization period of the power converter and associated with an auxiliary winding of the power converter; receiving an amplified signal; in response to the power converter operating under a first load condition, generating a compensation current based at least in part on the input signal and the amplified signal; in response to the power converter operating under a second load condition, generating the compensation current based at least in part on the input signal and the demagnetization signal; generating the amplified signal based on at least information associated with the compensation current; generating a drive signal based at least in part on the amplified signal; and outputting the drive signal to a switch to affect the first current flowing through the primary winding of the power converter. The first load condition and the second load condition are different. For example, the method is implemented according to at least FIG. 3, FIG. 4 and/or FIG. 7.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system controller for regulating a power converter, the system controller comprising:
 a multiplier configured to receive a demagnetization signal and generate a multiplication signal based on at least information associated with the demagnetization signal and a sampled-and-hold signal, the sampled-and-hold signal representing a peak of a first current flowing through a primary winding of a power converter, the demagnetization signal being related to a demagnetization period of the power converter and being associated with an auxiliary winding of the power converter; and a first filter configured to receive the multiplication signal and generate a first filtered signal based at least in part on the multiplication signal, the first filtered signal being related to a drive signal outputted to a switch to affect the first current flowing through the primary winding of the power converter.

2. The system controller of claim 1, and further comprising:
a buffer configured to receive the sampled-and-hold signal and generate a buffered signal;
wherein the multiplier is further configured to:
receive the buffered signal; and
generate the multiplication signal based on the buffered signal and the demagnetization signal.

3. The system controller of claim 1, and further comprising:
a voltage-to-current converter configured to receive the first filtered signal and generate a second current; and
a first signal combiner configured to receive the second current and a third current and generate a summation signal based at least in part on the second current and the third current.

4. The system controller of claim 3, and further comprising:
a second filter configured to receive the summation signal and generate a second filtered signal based at least in part on the summation signal;
a current source configured to generate a constant current; and
a second signal combiner configured to receive the second filtered signal and the constant current and output a compensation current to generate the drive signal.

5. The system controller of claim 4 wherein the second signal combiner is further configured to subtract the second filtered signal from the constant current to generate the compensation current.

6. The system controller of claim 3, and further comprising:
a transconductance amplifier configured to receive a second input signal and a reference signal and generate the third current;
wherein the third current is equal to an amplification value multiplied by a difference between the second input signal and the reference signal.

7. The system controller of claim 6 wherein the third current is equal to the amplification value multiplied by a subtraction result, the subtraction result being equal to the second input signal minus the reference signal.

8. The system controller of claim 3, and further comprising:
an error amplifier configured to generate a second input signal based on at least information associated with a compensation current;
wherein the system controller is configured to:
generate the drive signal based on at least information associated with the second input signal.

9. The system controller of claim 8 wherein the error amplifier is further configured to generate the second input signal based at least in part on a sampled signal associated with the auxiliary winding and a reference signal related to the compensation current.

10. The system controller of claim 1, and further comprising:
a second filter configured to generate a second filtered signal based on at least information associated with the first filtered signal, the second filtered signal being related to the drive signal.

11. The system controller of claim 1 wherein the system controller is configured to generate a compensation current based at least in part on the first filtered signal so that an output voltage of the power converter is independent of an output current of the power converter, the output voltage and the output current being related to a secondary winding of the power converter coupled to the primary winding.

12. The system controller of claim 1 wherein the system controller is further configured to generate a compensation current based at least in part on the first filtered signal to keep an output voltage of the power converter at a constant level under one or more load conditions of the power converter.

13. The system controller of claim 2 wherein the one or more load conditions include a no-load condition or a low-load condition.

14. The system controller of claim 2 wherein the one or more load conditions include a high condition.

15. A system controller for regulating a power converter, the system controller comprising:
an error amplifier configured to generate an input signal based on at least information associated with an output signal, the output signal being equal to an amplification value multiplied by a difference between the input signal and a reference signal;
wherein the system controller is configured to:
generate a drive signal based on at least information associated with the input signal; and
output the drive signal to a switch of a power converter to affect a current flowing through a primary winding of the power converter.

16. The system controller of claim 15 wherein the output signal is equal to the amplification value multiplied by a subtraction result, the subtraction result being equal to the input signal minus the reference signal.

17. The system controller of claim 15 wherein the output signal is related to a compensation current.

18. The system controller of claim 17 wherein the error amplifier is further configured to generate the input signal based on at least information associated with the compensation current.

19. The system controller of claim 18 wherein the error amplifier is further configured to receive a sampled signal associated with an auxiliary winding of the power converter and generate the input signal based on at least information associated with the compensation current and the sampled signal.

20. The system controller of claim 15, and further comprising:
a filter configured to generate a filtered signal based on at least information associated with the output signal;
wherein the system controller is further configured to:
generate the drive signal based on at least information associated with the filtered signal.

21. The system controller of claim 15 wherein the system controller is configured to generate a compensation current based at least in part on the output signal so that an output voltage of the power converter is independent of an output current of the power converter, the output voltage and the output current being related to a secondary winding of the power converter coupled to the primary winding.

22. The system controller of claim 15 wherein the system controller is further configured to generate a compensation current based at least in part on the output signal to keep an output voltage of the power converter at a constant level under one or more load conditions of the power converter.

23. The system controller of claim 22 wherein the one or more load conditions include a no-load condition or a low-load condition.

24. The system controller of claim 22 wherein the one or more load conditions include a high condition.

25. A method for regulating a power converter, the method comprising:
   receiving a demagnetization signal;
   generating a multiplication signal based on at least information associated with the demagnetization signal and the sampled-and-hold signal, the sampled-and-hold signal representing a peak of a first current flowing through a primary winding of the power converter, the demagnetization signal being related to a demagnetization period of the power converter and being associated with an auxiliary winding of the power converter;
   receiving the multiplication signal;
   generating a filtered signal based at least in part on the multiplication signal, the filtered signal being related to a drive signal; and
   outputting the drive signal to a switch to affect the current flowing through the primary winding of the power converter.

26. A method for regulating a power converter, the method comprising:
   generating an input signal based on at least information associated with an output signal, the output signal being equal to an amplification value multiplied by a difference between the input signal and a reference signal;
   generating a drive signal based on at least information associated with the input signal; and
   outputting the drive signal to a switch of the power converter to affect a current flowing through a primary winding of the power converter.

* * * * *